US008222969B2

(12) United States Patent
Nagai

(10) Patent No.: US 8,222,969 B2
(45) Date of Patent: Jul. 17, 2012

(54) DUPLEXER MODULE

(75) Inventor: Tatsuro Nagai, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/040,372

(22) Filed: Mar. 4, 2011

(65) Prior Publication Data

US 2011/0156835 A1 Jun. 30, 2011

Related U.S. Application Data

(63) Continuation of application No. PCT/JP2009/004305, filed on Sep. 1, 2009.

(30) Foreign Application Priority Data

Sep. 18, 2008 (JP) ................................. 2008-240012

(51) Int. Cl.
*H01P 5/12* (2006.01)
*H03H 7/46* (2006.01)
(52) U.S. Cl. .......................... 333/129; 333/126; 333/132
(58) Field of Classification Search .......... 333/126–129, 333/132, 134
See application file for complete search history.

(56) References Cited

U.S. PATENT DOCUMENTS

| 5,386,203 | A | 1/1995 | Ishihara |
| 6,724,278 | B1 | 4/2004 | Smith |
| 7,262,677 | B2 * | 8/2007 | Kubota et al. ................. 333/204 |
| 2002/0135267 | A1 | 9/2002 | Takamine |
| 2003/0132817 | A1 | 7/2003 | Nagai |
| 2008/0048315 | A1 | 2/2008 | Nagano et al. |
| 2008/0204163 | A1 * | 8/2008 | Royak et al. .................. 333/132 |
| 2009/0273409 | A1 | 11/2009 | Okuda |

FOREIGN PATENT DOCUMENTS

| JP | 05-167389 A | 7/1993 |
| JP | 06-188622 A | 7/1994 |
| JP | 10-041704 A | 2/1998 |
| JP | 10-290176 A | 10/1998 |
| JP | 2002-208832 A | 7/2002 |
| JP | 2002-535911 A | 10/2002 |
| JP | 2003-517239 A | 5/2003 |
| JP | 2003-204245 A | 7/2003 |
| JP | 2004-200853 A | 7/2004 |
| JP | 2006-237978 A | 9/2006 |
| WO | 2006/038421 A1 | 4/2006 |
| WO | 2008/096514 A1 | 8/2008 |

OTHER PUBLICATIONS

Official Communication issued in International Patent Application No. PCT/JP2009/004305, mailed on Dec. 8, 2009.

* cited by examiner

*Primary Examiner* — Robert Pascal
*Assistant Examiner* — Kimberly Glenn
(74) *Attorney, Agent, or Firm* — Keating & Bennett, LLP

(57) ABSTRACT

A duplexer module that is used for transmission and reception of a signal in at least two communication systems using different frequency bands includes a wiring board, dual transmission filters in a transmission filter unit that is provided on the wiring board and that includes a transmission filter, and dual reception filters in a reception filter unit that is provided on the wiring board and that includes a reception filter. Each of the dual reception filters includes at least two reception filters having different frequency bands, and the output side of the reception filters is shared between the reception filters such that a common output terminal is provided for the reception filters.

11 Claims, 14 Drawing Sheets

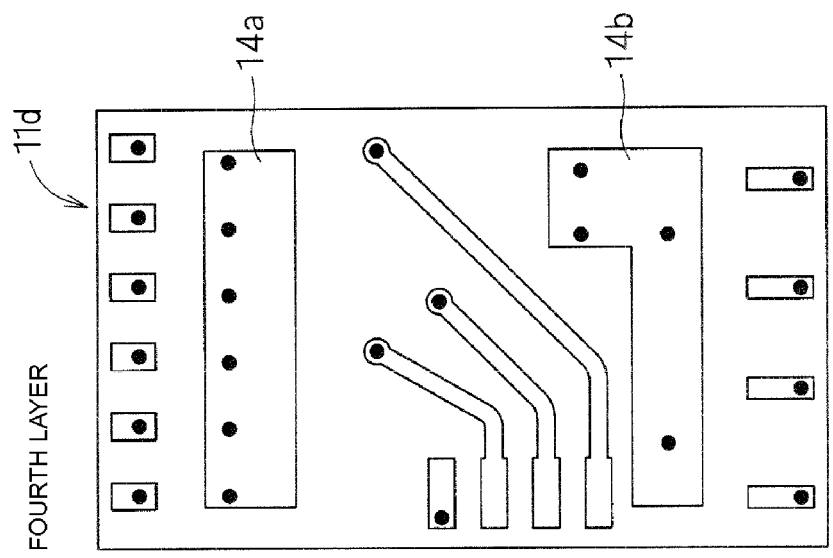
FIG. 6C  FOURTH LAYER
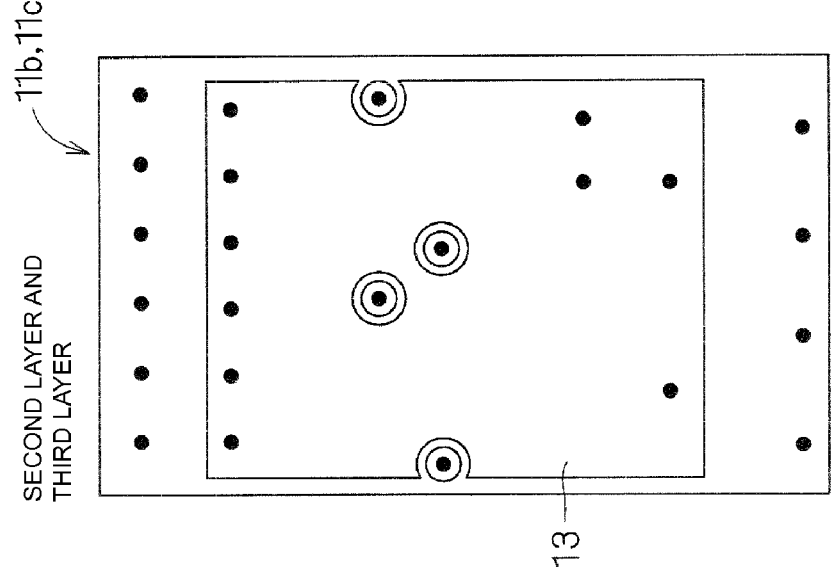
FIG. 6B  SECOND LAYER AND THIRD LAYER
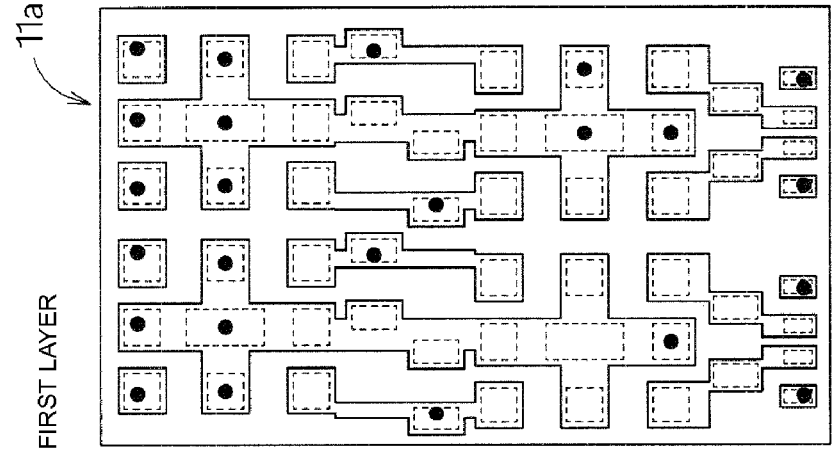
FIG. 6A  FIRST LAYER

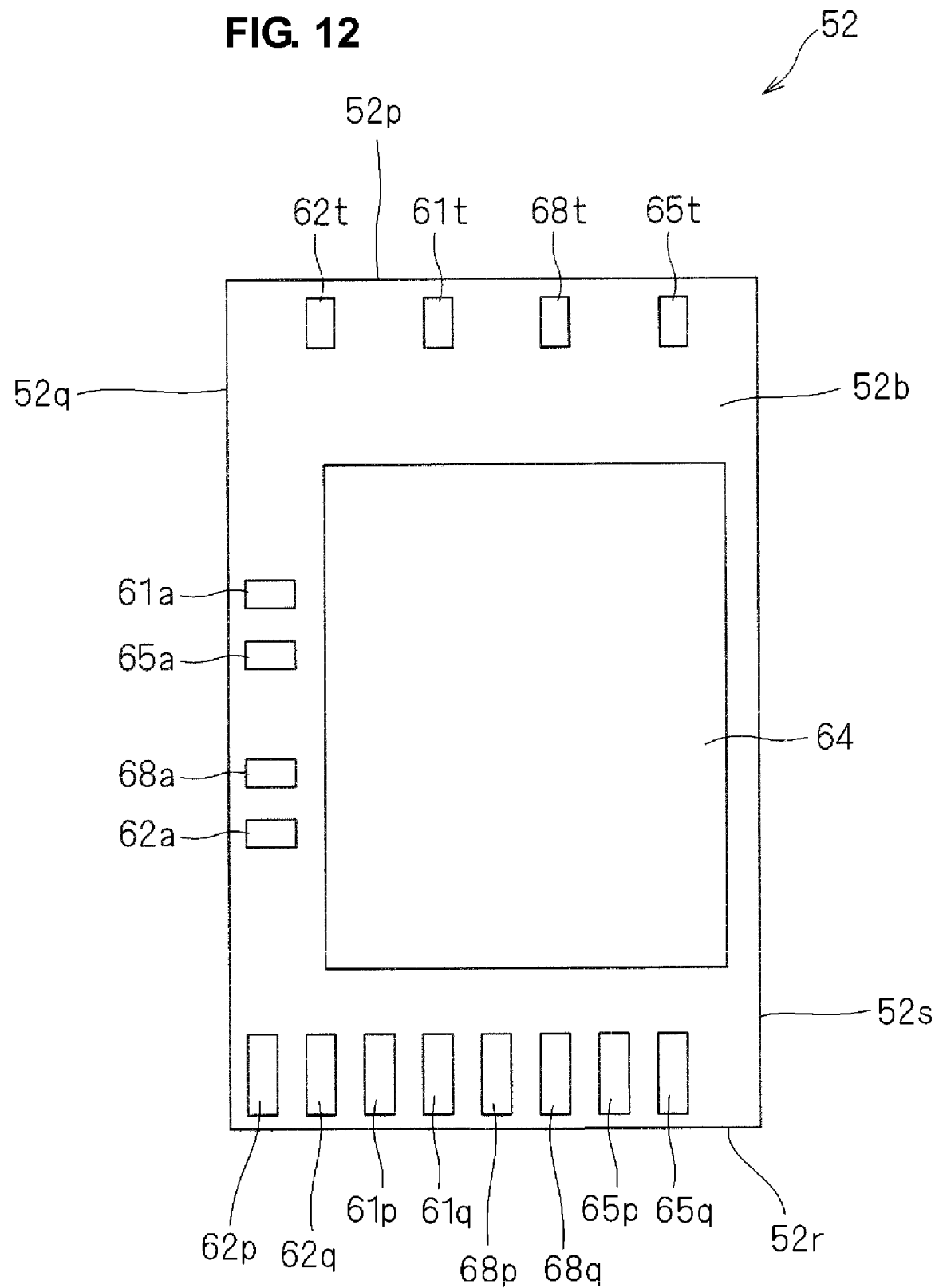

THIRD LAYER

SECOND LAYER

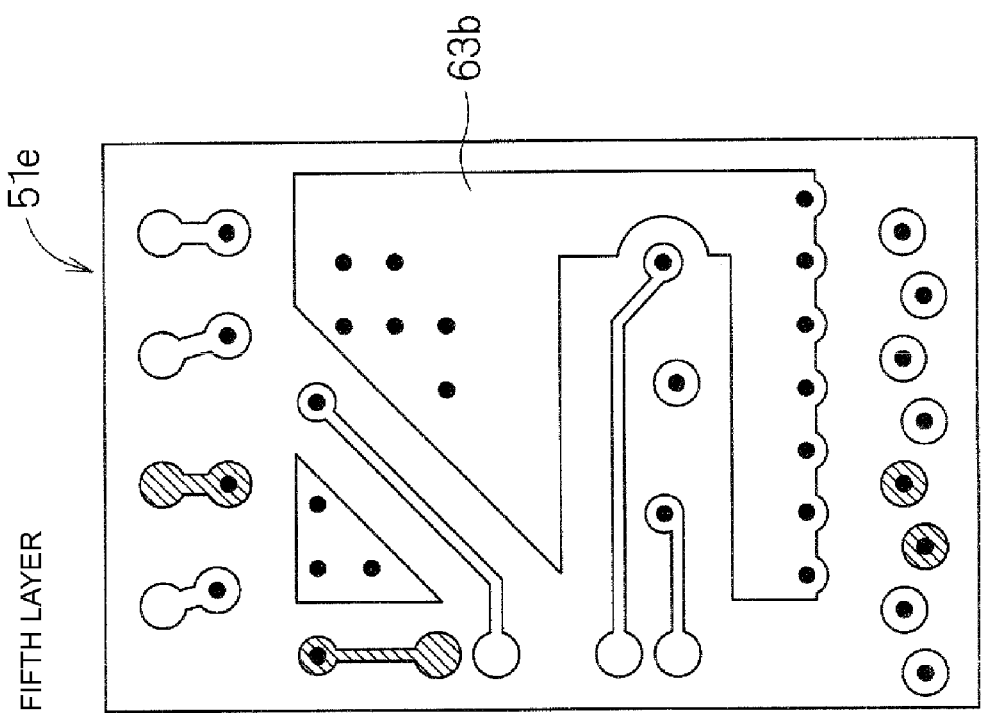
FIG. 15B  FIFTH LAYER
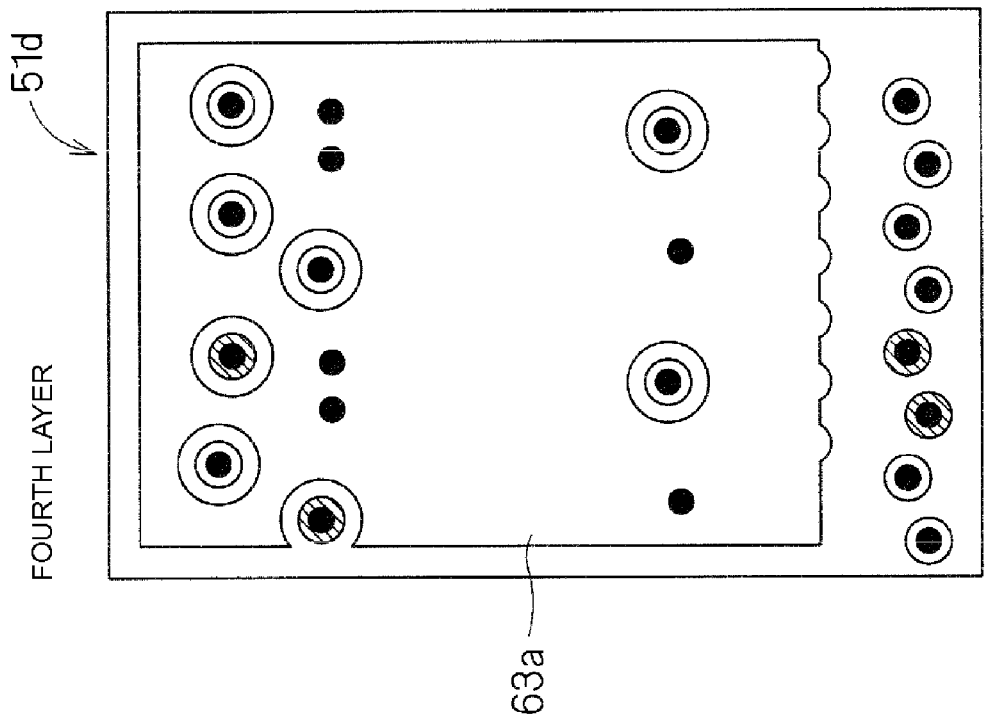
FIG. 15A  FOURTH LAYER

DUPLEXER MODULE

BACKGROUND OF THE INVENTION

1. Field of the Invention

The present invention relates to duplexer modules and, more particularly, to a duplexer module preferably for use in transmission and reception of signals in at least two communication systems using different frequency bands.

2. Description of the Related Art

In recent years, an increase in the number of frequency bands and support of multiple communication systems have been advanced in mobile phone services in order to address, for example, an increase in the number of subscribers, global roaming enabling services to be used all over the world, an improvement in communication quality, and an increase in the capacity of a variety of content. As a result, multiple duplexers used in radio-frequency (RF) circuits are increasingly installed in mobile phones. In other words, duplexers corresponding to multiple bands and communication systems that are used are increasingly installed in the mobile phones.

In addition to the increase in the number of duplexers installed in the mobile phones, duplexer modules in which multiple duplexers are integrated have been developed in order to decrease the size of mobile phones. Various duplexer modules have been proposed.

For example, Japanese Unexamined Patent Application Publication No. 2003-517239 discloses a duplexer module M1 schematically illustrated in FIG. 16. The duplexer module M1 is connected between an antenna A and a low noise amplifier LNA and a power amplifier PA via switches S, S', and S" and includes multiple transmission filters and reception filters. The duplexer module M1 includes transmission filters FT1 and FT2 and reception filters FR1 and FR2, instead of providing a plurality of duplexers each including a transmission filter and a reception filter on a wiring board. The transmission filters FT1 and FT2 are collectively provided at one side of the wiring board of duplexer module M1, and the reception filters FR1 and FR2 are collectively provided at the opposite side of the wiring board of the duplexer module M1. Such an arrangement allows the wiring pattern on the wiring board to be simplified in order to reduce the size of the duplexer module M1.

Technologies to arrange the wiring patterns of multiple surface acoustic wave filters together for simplification are known. For example, Japanese Unexamined Patent Application Publication No. 2002-208832 discloses an elastic wave apparatus schematically illustrated in FIG. 17. In the elastic wave apparatus in FIG. 17, balanced terminals 1305 and 1306 are commonly used for two balance filters 1301 and 1302 having different pass bands. Since an unbalanced terminal 1304 is also commonly used for the balance filters 1301 and 1302 in FIG. 17, the balance filters 1301 and 1302 function as one filter having the two pass bands. However, the elastic wave apparatus may be configured so that the unbalanced terminal is not commonly used for the balance filters 1301 and 1302.

In a typical duplexer module in the related art, multiple duplexers are provided on a wiring board and multiple transmission terminals and multiple reception terminals are collectively arranged on the rear surface of the wiring board. In order to simplify the wiring pattern on a circuit board on which components including the duplexer module, amplifiers, and switches are provided, it is necessary to use a layout in which the transmission terminals of the duplexer module are adjacently arranged and the reception terminals thereof are adjacently arranged.

However, when the transmission terminals of the duplexer module are adjacently arranged and the reception terminals thereof are adjacently arranged in a configuration in which multiple duplexers are provided on the wiring board, the wiring pattern on the wiring board including the duplexers provided thereon is lengthened and complicated, which degrades isolation characteristics and insertion loss.

Although the transmission filter FT1 and the reception filter FR1 support one frequency band and the transmission filter FT2 and the reception filter FR2 support another frequency band in Japanese Unexamined Patent Application Publication No. 2003-517239, the transmission filter FT1 and the reception filter FR1 may support the transmission band and the reception band of one communication system and the transmission filter FT2 and the reception filter FR2 may support the transmission band and the reception band of another communication system. Preparing the transmission filters and the reception filters of at least two communication systems using different frequency bands using the configuration described above to collectively arrange the transmission filters on the wiring board and collectively arrange the reception filters on the wiring board causes the wiring pattern on the wiring board to be lengthened and complicated, thus degrading electrical characteristics.

The technology disclosed in Japanese Unexamined Patent Application Publication No. 2002-208832, was originally intended to commonly use the balanced terminals (output terminals) in the multiple surface acoustic wave filters in the elastic wave apparatus. The idea of arranging the wiring patterns of the duplexer module together in order to simplify the wiring patterns on the circuit board on which the duplexer module is provided is unknown. In addition, a specific method of producing a wiring board that does not have the degradation in isolation characteristics and insertion loss by arranging the wiring patterns together for simplification is not publicly known.

SUMMARY OF THE INVENTION

In order to overcome the problems described above, preferred embodiments of the present invention provide a duplexer module capable of adjacently arranging transmission terminals and adjacently arranging reception terminals without degrading the electrical characteristics thereof.

A duplexer module according to a preferred embodiment of the present invention is preferably used for transmission and reception of signals in at least two communication systems using different frequency bands. The duplexer module preferably includes a wiring board, a transmission filter unit that is provided on the wiring board and that includes a transmission filter, and a reception filter unit that is provided on the wiring board and that includes a reception filter. At least one reception filter unit includes at least two reception filters having different frequency bands, and the output side of the reception filters is shared between the reception filters such that an output terminal is commonly used for the reception filters.

Since the output terminal is preferably commonly used for the reception filters in the reception filter unit including the multiple reception filters, the wiring pattern on the wiring board is simplified. Accordingly, the structure described above is superior in electrical characteristics, such as isolation characteristics and insertion loss, and less expensive than a case in which the output terminal is not commonly used for the reception filters.

At least one transmission filter unit preferably includes at least two transmission filters having different frequency bands, and the input side of the transmission filters is preferably shared between the transmission filters such that an input terminal is commonly used for the transmission filters.

Since the input terminal is preferably commonly used for the transmission filters in the transmission filter unit including the multiple transmission filters, the number of terminals is reduced to further simplify the wiring pattern on the wiring board. In addition, it is not necessary to include a switch connected to a power amplifier.

A duplexer module according to another preferred embodiment of the present invention preferably includes a wiring board, a transmission filter unit that is provided on the wiring board and that includes a transmission filter, and a reception filter unit that is provided on the wiring board and that includes a reception filter. At least one transmission filter unit includes at least two transmission filters having different frequency bands, and the input side of the transmission filters is shared between the transmission filters such that an input terminal is commonly used for the transmission filters.

Since the input terminal is preferably commonly used for the transmission filters in the transmission filter unit including the multiple transmission filters, the wiring pattern on the wiring board is simplified. Accordingly, the structure described above is superior in electrical characteristics, such as isolation characteristics and insertion loss, and is less expensive than a case in which the input terminal is not commonly used for the transmission filters. In addition, it is not necessary include a switch connected to the power amplifier.

The wiring board preferably has a substantially rectangular first main surface and a substantially rectangular second main surface that are parallel or substantially parallel to each other, a first side surface, a second side surface adjacent to the first side surface, a third side surface opposing the first side surface, and a fourth side surface adjacent to the first side surface. A first conductive pattern including a plurality of pads on which the reception filter unit and the transmission filter unit are mounted is preferably provided on the first main surface of the wiring board. A second conductive pattern including a plurality of transmission terminals arranged along the first side surface, a plurality of antenna terminals arranged along the second side surface, and a plurality of reception terminals arranged along the third side surface is preferably provided on the second main surface of the wiring board.

The first conductive pattern may preferably include a first wiring pattern connected to any pad. The second conductive pattern may preferably include a second wiring pattern connected to any terminal.

The wiring patterns connecting the pads at the side of the first main surface of the wiring board to the terminals at the side of the second main surface thereof can be simplified so as to shorten the wiring patterns as much as possible, thus improving the isolation.

The reception filter unit is preferably arranged near the third side surface of the wiring board on the first main surface of the wiring board.

In this case, the wiring pattern between the reception filter and the reception terminals is shortened to improve the isolation.

The transmission filter unit is preferably arranged near the first side surface of the wiring board on the first main surface of the wiring board.

In this case, the wiring pattern between the transmission filter and the transmission terminals is preferably shortened to improve the isolation.

The reception filter unit preferably includes an output terminal, and the output terminal of the reception filter unit is preferably connected to the pads arranged along the third side surface on the first main surface of the wiring board.

In this case, the wiring pattern between the reception filter and the reception terminals is preferably shortened to improve the isolation.

The transmission filter unit preferably includes an input terminal, and the input terminal of the transmission filter unit is preferably connected to the pads arranged along the first side surface on the first main surface of the wiring board.

In this case, the wiring pattern between the transmission filter and the transmission terminals is shortened to improve the isolation.

Since the duplexer module according to various preferred embodiments of the present invention simplify the wiring patterns on the wiring board, it is possible to adjacently arrange the transmission terminals and adjacently arrange the reception terminals without degrading the electrical characteristics thereof.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6A is a plan view of a first-layer conductive pattern of the wiring board, FIG. 6B is a perspective view of second-layer and third-layer conductive patterns of the wiring board, and FIG. 6C is a perspective view of a fourth-layer conductive pattern of the wiring board according to the first preferred embodiment of the present invention.

FIG. 12 is a perspective view illustrating a conductive pattern on a rear surface of the wiring board according to the comparative example.

FIG. 15A is a perspective view of a fourth-layer conductive pattern of the wiring board and FIG. 15B is a perspective view of a fifth-layer conductive pattern of the wiring board according to the comparative example.

DETAILED DESCRIPTION OF THE PREFERRED EMBODIMENTS

Figure 1:
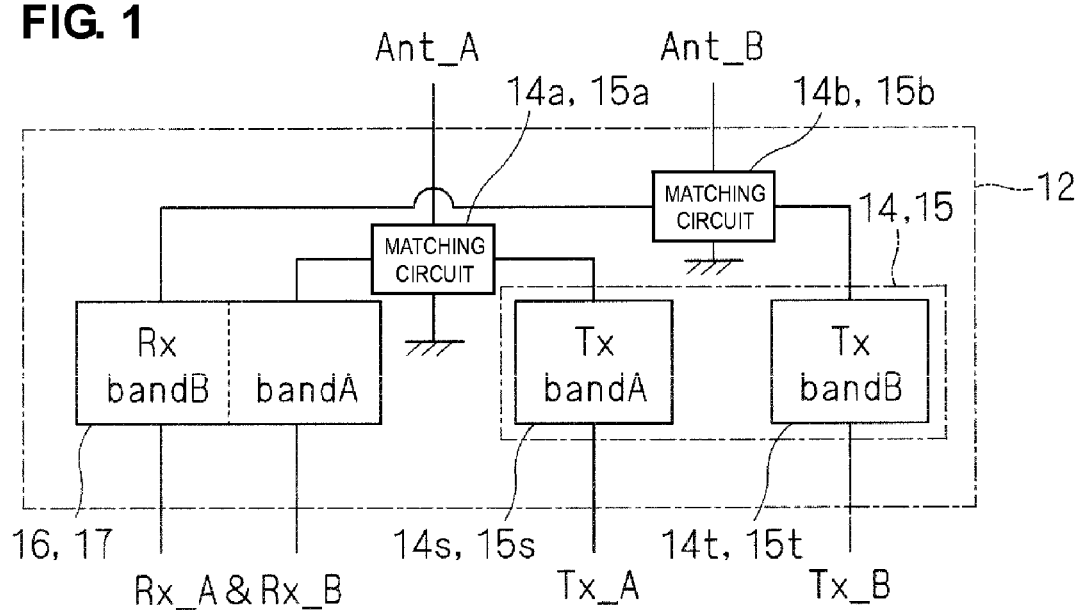
FIG. 1 is a block diagram of a duplexer module for two bands according to a first preferred embodiment of the present invention.

Preferred embodiments of the present invention will be described with reference to FIGS. 1 to 15B.

First Preferred Embodiment

A duplexer module 10 according to a first preferred embodiment of the present invention will now be described with reference to FIGS. 1 to 6B.

The duplexer module 10 of the first preferred embodiment includes transmission filters and reception filters provided therein and is preferably used in a mobile phone, for example. The transmission filters and the reception filters preferably support, for example, four bands (bands 1, 2, 5, and 8) in Universal Mobile Telecommunications System (UMTS).

The band 1 of the UMTS has a transmission band (Tx band) of 1,920 MHz to 1,980 MHz and a reception band (Rx band) of 2,110 MHz to 2,170 MHz. The band 2 of the UMTS has a Tx band of 1,850 MHz to 1,910 MHz and an Rx band of 1,930 MHz to 1,990 MHz. The band 5 of the UMTS has a Tx band of 824 MHz to 849 MHz and an Rx band of 869 MHz to 894 MHz. The band 8 of the UMTS has a Tx band of 880 MHz to 915 MHz and an Rx band of 925 MHz to 960 MHz.

The transmission filter and the reception filter supporting the band 1 and the band 2 and the transmission filter and the reception filter supporting the band 5 and the band 8 are preferably arranged as illustrated in the block diagram in FIG. 1.

Specifically, referring to FIG. 1, a band A supports the band 1 or the band 5 and a band B supports the band 2 or the band 8. A reception filter unit for the band A and the band B (a dual reception filter 16 for the band 1 and the band 2 and a dual reception filter 17 for the band 5 and the band 8), a transmission filter unit for the band A and the band B (a dual transmission filter 14 for the band 1 and the band 2 and a dual transmission filter 15 for the band 5 and the band 8), and matching circuits for the band A and the band B (a matching circuit 14a for the band 1, a matching circuit 14b for the band 2, a matching circuit 15a for the band 5, and a matching circuit 15b for the band 8) are preferably provided on a wiring board 12 represented by an alternate long and short dash line.

Preferably, each of the dual reception filters 16 and 17 in the reception filter unit includes a reception filter for the band A and a reception filter for the band B, which are different in frequency, and two unbalanced inputs-one balanced output. Specifically, the reception filters for the band A and the band B are preferably filters having a balanced-unbalanced conversion function, and a balanced output terminal is commonly used for the reception filter for the band A and the reception filter for the band B in the dual reception filters 16 and 17. As illustrated in FIG. 1, each of the dual reception filters 16 and 17 preferably includes an unbalanced input terminal connected to the matching circuits 14a and 15a for the band A, an unbalanced input terminal connected to the matching circuits 14b and 15b for the band B, and a pair of balanced output terminals commonly used for the band A and the band B.

The dual transmission filters 14 and 15 in the transmission filter unit preferably include transmission filters 14s and 14t, and 15s and 15t with unbalanced input and output for the band A and the band B (the transmission filter 14s for the band 1, the transmission filter 14t for the band 2, the transmission filter 15s for the band 5, and the transmission filter 15t for the band 8), and include two unbalanced inputs-two unbalanced outputs. As illustrated in FIG. 1, each of the dual transmission filters 14 and 15 preferably includes an unbalanced output terminal connected to the matching circuits 14a and 15a for the band A, an unbalanced output terminal connected to the matching circuits 14b and 15b for the band B, an unbalanced input terminal for the band A, and an unbalanced input terminal for the band B.

Since the duplexer module 10 of the first preferred embodiment supports the bands 1, 2, 5, and 8, the dual reception filter 16 for the band 1 and the band 2, the dual transmission filter 14 for the band 1 and the band 2, the matching circuit 14a for the band 1, the matching circuit 14b for the band 2, the dual reception filter 17 for the band 5 and the band 8, the dual transmission filter 15 for the band 5 and the band 8, the matching circuit 15a for the band 5, and the matching circuit 15b for the band 8 are provided on the wiring board 12. The duplexer module 10 of the first preferred embodiment preferably includes an antenna terminal Ant_A for the band 1, an antenna terminal Ant_B for the band 2, a transmission terminal Tx_A for the band 1, a transmission terminal Tx_B for the band 2, a reception terminal Rx_A&Rx_B commonly used for the band 1 and the band 2, an antenna terminal Ant_A for the band 5, an antenna terminal Ant_B for the band 8, a transmission terminal Tx_A for the band 5, a transmission terminal Tx_B for the band 8, and a reception terminal Rx_A&Rx_B commonly used for the band 5 and the band 8.

The reception filters in the dual reception filters 16 and 17 and the transmission filters in the dual transmission filters 14 and 15 are preferably defined by, for example, surface acoustic wave filters, boundary acoustic wave filters, or bulk wave resonator filters. When the reception filters and the transmission filters are defined by the surface acoustic wave filters or the boundary acoustic wave filters, the reception filter for the band A and the reception filter for the band B in the dual reception filters 16 and 17 may preferably be provided on one piezoelectric substrate. The transmission filter for the band A and the transmission filter for the band B in the dual transmission filters 14 and 15 may also preferably be provided on one piezoelectric substrate.

The matching circuits may also preferably be provided at the side of the transmission terminals Tx_A and Tx_B and the reception terminals Rx_A&Rx_B of the dual reception filters 16 and 17 and the dual transmission filters 14 and 15, in addition to the side of the antenna terminals Ant_A and Ant_B thereof.

Figure 2:
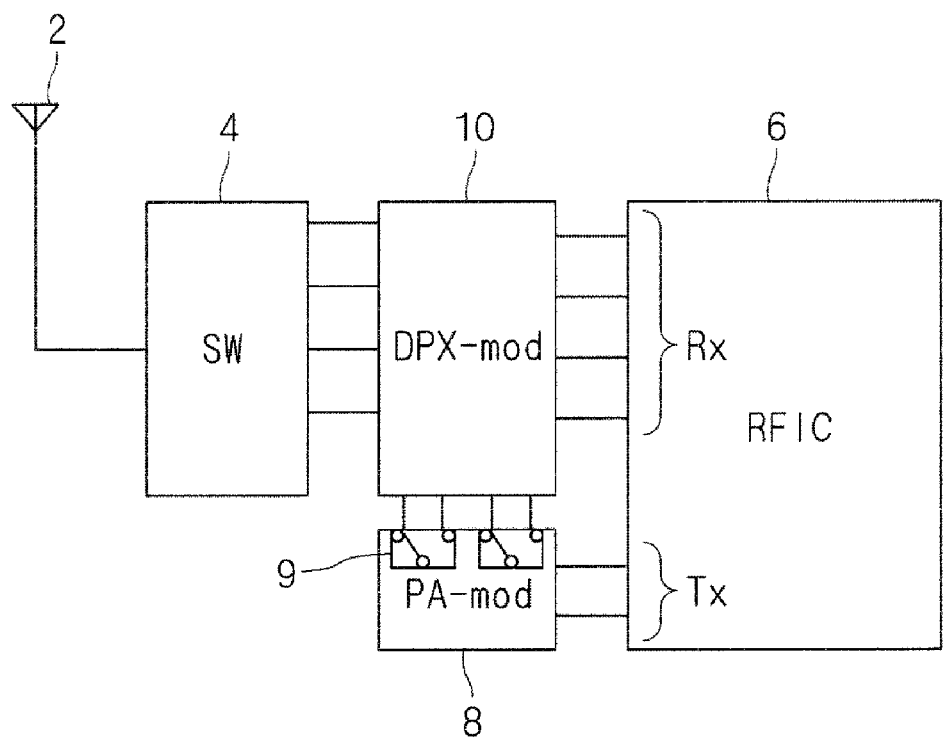
FIG. 2 is a block diagram illustrating how the duplexer module according to the first preferred embodiment of the present invention is used.

FIG. 2 is a block diagram illustrating one example of how the duplexer module 10 of the first preferred embodiment is preferably used. As illustrated in FIG. 2, preferably, four antenna terminals supporting the bands 1, 2, 5, and 8 of the duplexer module 10 are connected to an antenna 2 via a switching circuit 4. Four reception terminals of the duplexer module 10 are preferably connected to an Rx terminal of a radio-frequency integrated circuit (RFIC) 6. The four reception terminals of the duplexer module 10 preferably include a pair of balanced output terminals commonly used for the reception filters for the band 1 and the band 2 and a pair of balanced output terminals commonly used for the reception filters for the band 5 and the band 8. Four transmission terminals supporting the bands 1, 2, 5, and 8 of the duplexer module 10 are preferably connected to a Tx terminal of the RFIC 6 via a power amplifier module 8. The four transmission terminals of the duplexer module 10 are preferably unbalanced input terminals corresponding to the respective transmission filters for the bands 1, 2, 5, and 8. The power amplifier module 8 preferably includes Single Pole Double Throw (SPDT) switches 9 connected between power amplifiers in the power amplifier module 8 and the transmission terminals of the duplexer module 10 in order to reduce the number of power amplifiers.

Adjacently arranging the multiple reception terminals of the duplexer module 10 and adjacently arranging the multiple transmission terminals of the duplexer module 10 enable the wiring pattern on a circuit board on which the duplexer module 10, the RFIC 6, and other components are provided to be simplified and enable the size of the circuit board to be reduced.

Figure 3:
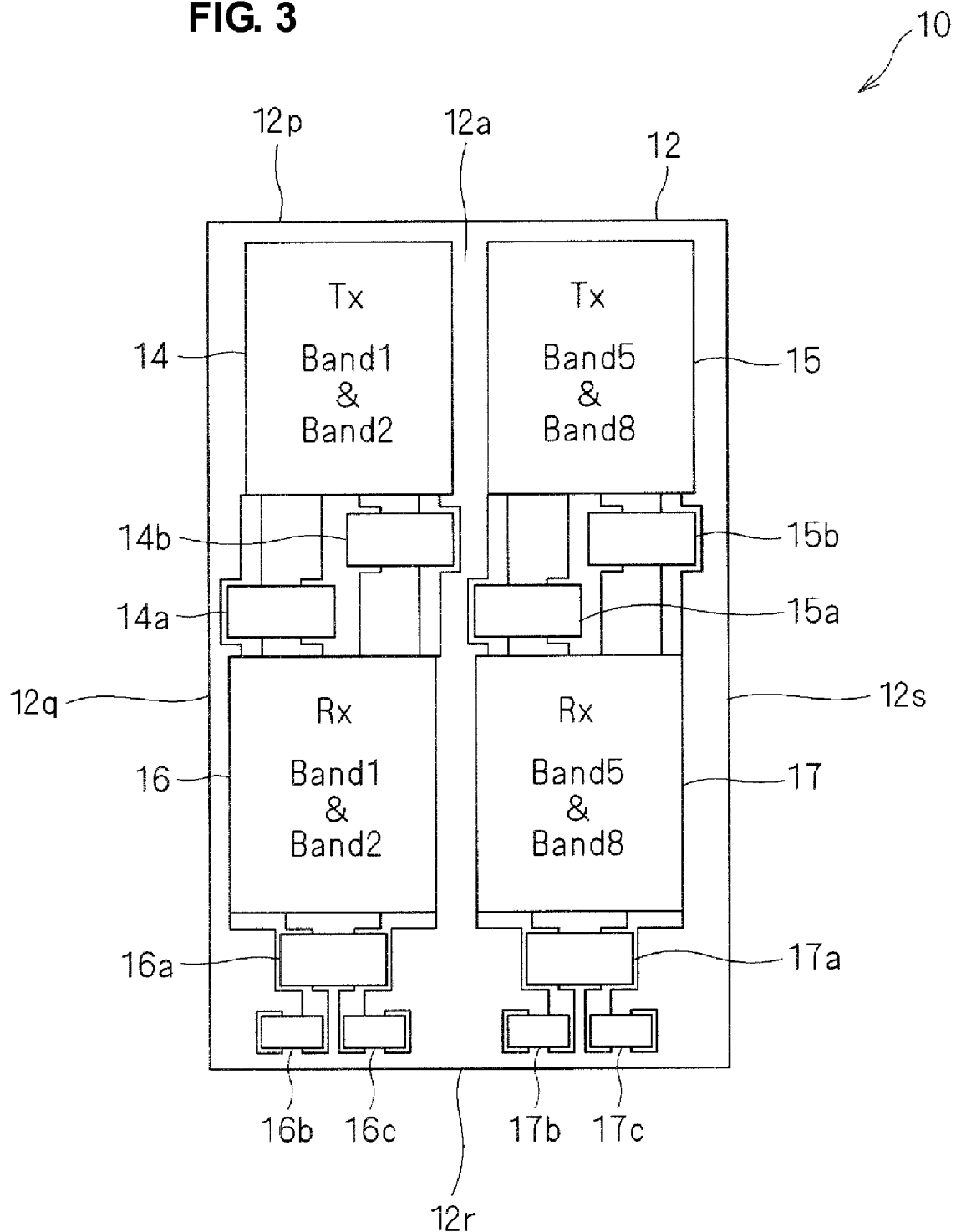
FIG. 3 is a plan view illustrating a state in which components are mounted on a front surface of a wiring board of the duplexer module according to the first preferred embodiment of the present invention.
Figure 4:
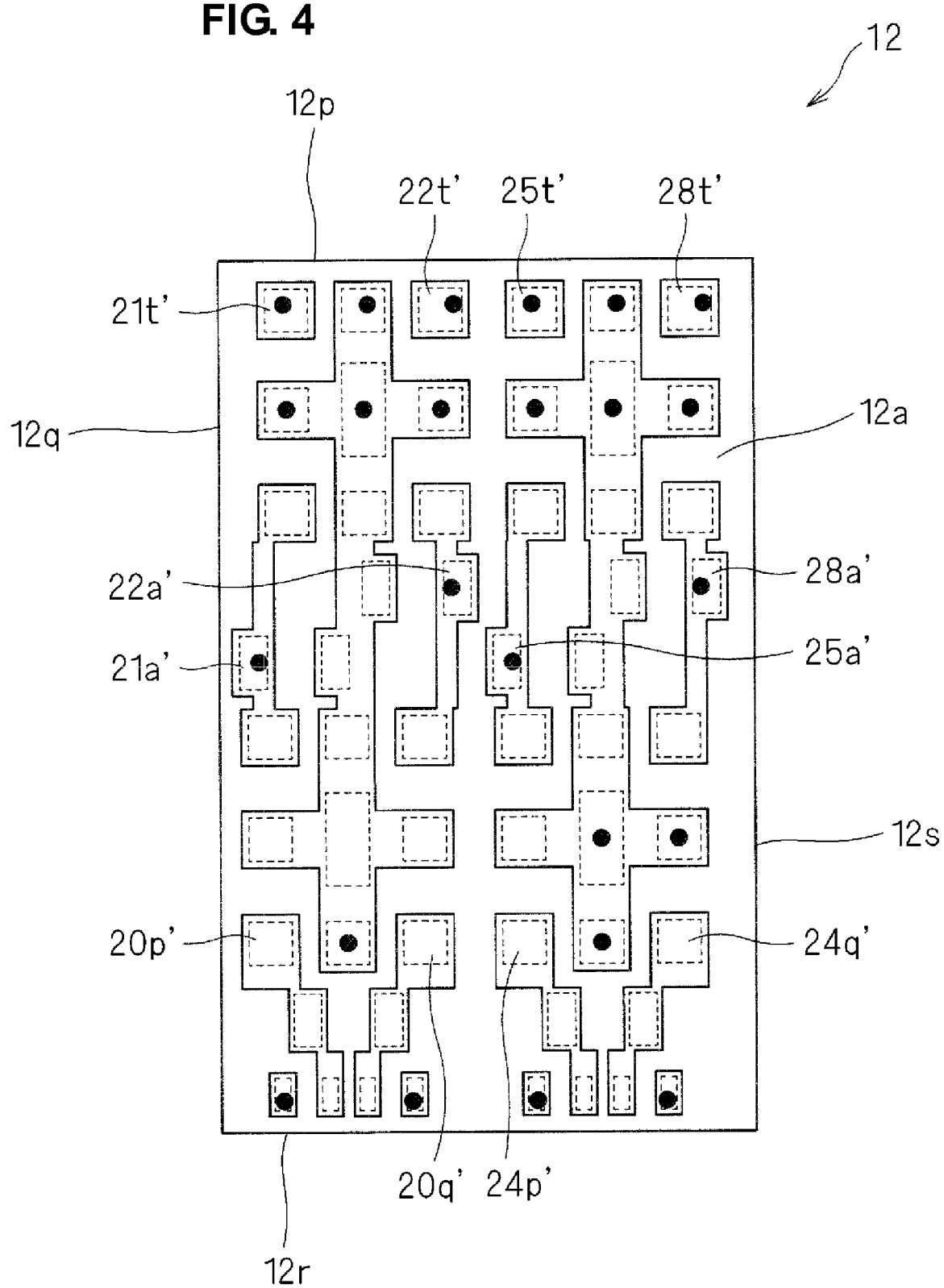
FIG. 4 is a plan view illustrating a conductive pattern on the front surface of the wiring board according to the first preferred embodiment of the present invention.
Figure 5:
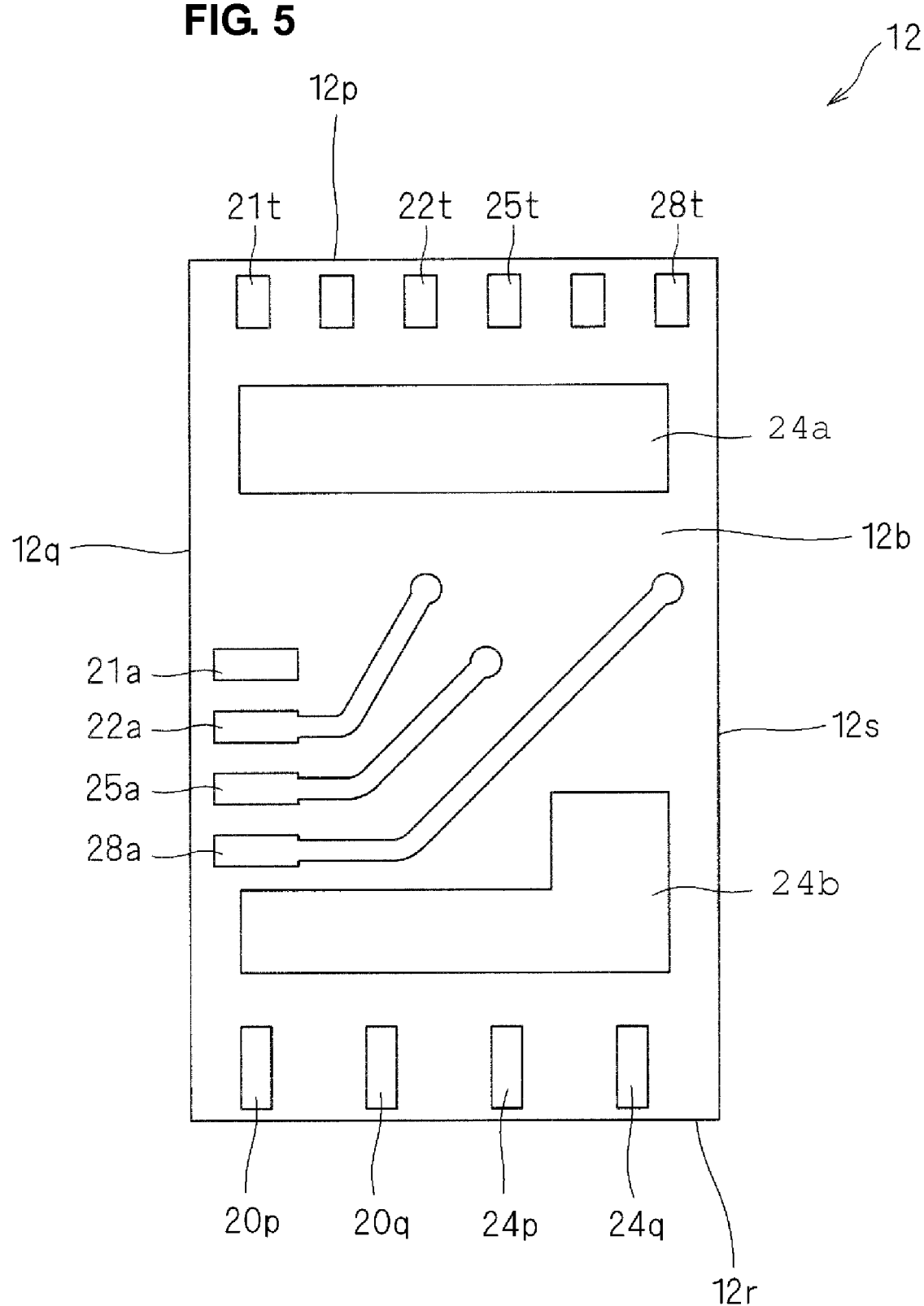
FIG. 5 is a perspective view illustrating a conductive pattern on a rear surface of the wiring board according to the first preferred embodiment of the present invention.

FIG. 3 is a plan view illustrating a state in which components are mounted on a front surface 12a of the wiring board 12 of the duplexer module 10 of the first preferred embodiment. FIG. 4 is a plan view of the front surface 12a of the wiring board 12. FIG. 5 is a perspective view of a rear surface 12b of the wiring board 12.

As illustrated in FIG. 3 to FIG. 5, the wiring board has a substantially rectangular front surface 12a and a substantially rectangular rear surface 12b, which are parallel or substantially parallel to each other and which define a first main surface and a second main surface, and four side surfaces defined by first to fourth side surfaces 12p, 12q, 12r, and 12s.

As illustrated in FIG. 3, the dual transmission filter 14 for the band 1 and the band 2, the dual transmission filter 15 for the band 5 and the band 8, the dual reception filter 16 for the band 1 and the band 2, the dual reception filter 17 for the band 5 and the band 8, and chip components (multilayer chip capacitors or inductors) 14a, 14b, 15a, 15b, 16a to 16c and 17a to 17c defining the matching circuits are preferably mounted on the front surface 12a of the wiring board 12.

The dual transmission filters 14 and 15 are preferably arranged near the first side surface 12p of the wiring board 12 on the front surface 12a of the wiring board 12. The dual reception filters 16 and 17 are preferably arranged near the third side surface 12r of the wiring board 12 on the front surface 12a of the wiring board 12.

As illustrated in FIG. 4, a first conductive pattern is preferably provided on the front surface 12a of the wiring board 12. Broken lines in FIG. 4 indicate the terminal portions of the dual transmission filters 14 and 15, the dual reception filters 16 and 17, and the chip components 14a, 14b, 15a, 15b, 16a to 16c, and 17a to 17c, which are mounted on the front surface 12a of the wiring board 12. As illustrated in FIG. 4, for example, pads 21t', 22t', 25t', and 28t'; 21a', 22a', 25a', and 28a'; and 20p', 20q', 24p', and 24q' connected to the dual transmission filters 14 and 15, the dual reception filters 16 and 17, and the chip components 14a, 14b, 15a, 15b, 16a to 16c, and 17a to 17c are preferably arranged on portions on which the broken lines are superposed on the first conductive pattern provided on the front surface 12a of the wiring board 12. In addition, a first wiring pattern connected to these pads is provided.

The dual transmission filter 14 includes an unbalanced input terminal corresponding to the transmission filter 14s for the band 1 and an unbalanced input terminal corresponding to the transmission filter 14t for the band 2. The dual transmission filter 15 includes an unbalanced input terminal corresponding to the transmission filter 15s for the band 5 and an unbalanced input terminal corresponding to the transmission filter 15t for the band 8.

The pads 21t', 22t', 25t', and 28t' are preferably arranged along the first side surface 12p on the wiring board 12 of the wiring board 12. The unbalanced input terminal corresponding to the transmission filter 14s for the band 1 in the dual transmission filter 14 is preferably connected to the pad 21t' and the unbalanced input terminal corresponding to the transmission filter 14t for the band 2 in the dual transmission filter 14 is preferably connected to the pad 22t'. The unbalanced input terminal corresponding to the transmission filter 15s for the band 5 in the dual transmission filter 15 is preferably connected to the pad 25t' and the unbalanced input terminal corresponding to the transmission filter 15t for the band 8 in the dual transmission filter 15 is preferably connected to the pad 28t'.

The dual reception filter 16 preferably includes a pair of balanced output terminals commonly used for the reception filters for the band 1 and the band 2. The dual reception filter 17 preferably includes a pair of balanced output terminals commonly used for the reception filters for the band 5 and the band 8.

The pads 20p', 20q', 24p', and 24q' are preferably arranged along the third side surface 12r on the front surface 12a of the wiring board 12. One of the paired balanced output terminals commonly used for the reception filters for the band 1 and the band 2 in the dual reception filter 16 is preferably connected to the pad 20p' and the other thereof is preferably connected to the pad 20q'. One of the paired balanced output terminals commonly used for the reception filters for the band 5 and the band 8 in the dual reception filter 17 is preferably connected to the pad 24p' and the other thereof is preferably connected to the pad 24q'.

The dual transmission filter 14 preferably includes an unbalanced output terminal corresponding to the transmission filter 14s for the band 1 and an unbalanced output terminal corresponding to the transmission filter 14t for the band 2. The dual reception filter 16 preferably includes an unbalanced input terminal corresponding to the reception filter for the band 1 and an unbalanced input terminal corresponding to the reception filter for the band 2.

The unbalanced output terminal corresponding to the transmission filter 14s for the band 1 in the dual transmission filter 14 and the unbalanced input terminal corresponding to the reception filter for the band 1 in the dual reception filter 16 are preferably connected to the pad 21a'. The unbalanced output terminal corresponding to the transmission filter 14t for the band 2 in the dual transmission filter 14 and the unbalanced input terminal corresponding to the reception filter for the band 2 in the dual reception filter 16 are preferably connected to the pad 22a'.

The dual transmission filter 15 preferably includes an unbalanced output terminal corresponding to the transmission filter 15s for the band 5 and an unbalanced output terminal corresponding to the transmission filter 15t for the band 8. The dual reception filter 17 preferably includes an unbalanced input terminal corresponding to the reception filter for the band 5 and an unbalanced input terminal corresponding to the reception filter for the band 8.

The unbalanced output terminal corresponding to the transmission filter 15s for the band 5 in the dual transmission filter 15 and the unbalanced input terminal corresponding to the reception filter for the band 5 in the dual reception filter 17 are preferably connected to the pad 25a'. The unbalanced output terminal corresponding to the transmission filter 15t for the band 8 in the dual transmission filter 15 and the unbalanced input terminal corresponding to the reception filter for the band 8 in the dual reception filter 17 are preferably connected to the pad 28a'.

As illustrated in FIG. 5, a second conductive pattern is preferably arranged on the rear surface 12b of the wiring board 12. Specifically, a transmission terminal 21t for the band 1, a transmission terminal 22t for the band 2, a transmission terminal 25t for the band 5, and a transmission terminal 28t for the band 8 are preferably arranged along the first side surface 12p of the wiring board 12. An antenna terminal 21a for the band 1, an antenna terminal 22a for the band 2, an antenna terminal 25a for the band 5, and an antenna terminal 28a for the band 8 are preferably arranged along the second side surface 12q of the wiring board 12. Reception terminals 20p and 20q, which are preferably balanced output terminals commonly used for the band 1 and the band 2, and reception terminals 24p and 24q, which are balanced output terminals commonly used for the band 5 and the band 8, are preferably arranged along the third side surface 12r of the wiring board 12. In addition, a second wiring pattern connected to the antenna terminals 22a, 25a, and 28a and shield patterns 24a and 24b are preferably arranged on the rear surface 12b of the wiring board 12. A ground terminal is preferably arranged between the transmission terminal 21t for the band 1 and the transmission terminal 22t for the band 2 and a ground terminal is preferably arranged between the transmission terminal 25t for the band 5 and the transmission terminal 28t for the band 8.

Preferably, the transmission terminal 21t for the band 1 corresponds to the transmission terminal Tx_A for the band 1 in FIG. 1. The transmission terminal 22t for the band 2 corresponds to the transmission terminal Tx_B for the band 2 in FIG. 1. The transmission terminal 25t for the band 5 corresponds to the transmission terminal Tx_A for the band 5 in FIG. 1. The transmission terminal 28t for the band 8 corresponds to the transmission terminal Tx_B for the band 8 in FIG. 1.

Preferably, the antenna terminal 21a for the band 1 corresponds to the antenna terminal Ant_A for the band 1 in FIG. 1. The antenna terminal 22a for the band 2 corresponds to the antenna terminal Ant_B for the band 2 in FIG. 1. The antenna terminal 25a for the band 5 corresponds to the antenna terminal Ant_A for the band 5 in FIG. 1. The antenna terminal 28a for the band 8 corresponds to the antenna terminal Ant_B for the band 8 in FIG. 1.

The reception terminals 20p and 20q, which are the balanced output terminals commonly used for the band 1 and the band 2, preferably correspond to the reception terminal Rx_A&Rx_B commonly used for the band 1 and the band 2 in FIG. 1. The reception terminals 24p and 24q, which are the balanced output terminals commonly used for the band 5 and the band 8, preferably correspond to the reception terminal Rx_A&Rx_B commonly used for the band 5 and the band 8 in FIG. 1.

Black circles (●) in FIG. 4 indicate the positions of feed-through conductors that vertically extend with respect to the front surface 12a and the rear surface 12b of the wiring board 12 in the wiring board 12 and that electrically connect the first conductive pattern on the front surface 12a of the wiring board 12 to the second conductive pattern on the rear surface 12b thereof.

As illustrated in FIGS. 6A to 6C, the wiring board 12 is preferably manufactured by laminating four conductive patterns 11a to 11d on three dielectric layers made of resin or ceramics. FIG. 6A is a plan view of the first-layer conductive pattern 11a and corresponds to FIG. 4. Specifically, the first-layer conductive pattern 11a is the first conductive pattern. FIG. 6B is a perspective view of the second-layer and third-layer conductive patterns 11b and 11c. The second-layer conductive pattern 11b has the same or substantially the same shape as that of the third-layer conductive pattern 11c. FIG. 6C is a perspective view of the fourth-layer conductive pattern 11d and corresponds to FIG. 5. Specifically, the fourth-layer conductive pattern 11d is the second conductive pattern. Black circles (●) in FIGS. 6A-6C indicate the positions of feed-through conductors. The black circles (●) in FIG. 6A indicate the positions of the feed-through conductors that vertically extend with respect to the front surface 12a and the rear surface 12b of the wiring board 12 in the wiring board 12 and that electrically connect the first conductive pattern (the conductive pattern 11a) on the front surface 12a of the wiring board 12 to the second conductive pattern (the conductive pattern 11d) on the rear surface 12b thereof, like the black circles (●) in FIG. 4. The black circles (●) in FIG. 6B indicate the positions of the feed-through conductors that electrically connect the conductive pattern 11b to the conductive pattern 11a and the feed-through conductors that electrically connect the conductive pattern 11c to the conductive pattern 11b. The black circles (●) in FIG. 6C indicate the positions of the feed-through conductors that electrically connect the conductive pattern 11d to the conductive pattern 11c.

As illustrated in FIGS. 6A to 6C, a shield pattern 13 separated from the feed-through conductors is preferably provided on the second-layer and third-layer conductive patterns 11b and 11c sandwiched between the first-layer conductive pattern 11a on which the first conductive pattern including the pads having the dual transmission filters 14 and 15, the dual reception filters 16 and 17, and the chip components 14a, 14b, 15a, 15b, 16a to 16c, and 17a to 17c mounted thereon is provided and the fourth-layer conductive pattern 11d on which the second conductive pattern including the terminals used for mounting the duplexer module 10 on the circuit board is provided. The shield pattern 13 extends parallel or substantially parallel to the front surface 12a and the rear surface 12b of the wiring board 12 in the wiring board 12.

Referring to FIG. 4, among the pads at the side of the front surface 12a of the wiring board 12, the pads electrically connected to the terminals at the side of the rear surface 12b of the wiring board 12 illustrated in FIG. 5 are denoted by reference numerals with the addition of a slash (') to the reference numerals of the terminals to which the pads are electrically connected.

As shown in FIG. 4 to FIG. 6C, the transmission terminals 21t, 22t, 25t, and 28t are electrically connected to the pads 21t', 22t', 25t', and 28t' via the feed-through conductors without routing the wiring pattern. The wiring pattern connecting the antenna terminals 21a, 22a, 25a, and 28a to the pads 21a', 22a', 25a', and 28a' is preferably routed on the front surface 12a and the rear surface 12b of the wiring board 12. The wiring pattern connecting the reception terminals 20p, 20q, 24p, and 24q to the pads 20p', 20q', 24p', and 24q' is preferably routed on the front surface 12a of the wiring board 12.

Since the wiring pattern connecting the pads on the front surface 12a of the wiring board 12 to the terminals on the rear surface 12b thereof is not routed in the wiring board 12, the structure of the wiring board 12 is simplified. Accordingly, the duplexer module 10 has a reduced amount of conductor loss due to the wiring patterns and improved transmission characteristics. In addition, linkage between the wiring patterns is prevented so as to improve the isolation characteristics.

Furthermore, since the duplexer module 10 includes a decreased number of layers of the wiring board as compared to the structure of a typical duplexer module in which the duplexers of the respective bands are provided on the wiring board, as in a comparative example described below, it is possible to reduce the profile and to reduce the cost of the duplexer module.

Second Preferred Embodiment

A duplexer module 10x according to a second preferred embodiment of the present invention will now be described with reference to FIG. 7 and FIG. 8.

The duplexer module 10x of the second preferred embodiment is preferably configured in substantially the same manner as in the duplexer module 10 of the first preferred embodiment. The same reference numerals are used in the second preferred embodiment to identify the same components as those of the first preferred embodiment. Differences from the first preferred embodiment will primarily be described below.

The duplexer module 10x of the second preferred embodiment includes transmission filters and reception filters provided therein and the transmission filters and the reception filters support the four bands (bands 1, 2, 5, and 8) in the UMTS, as in the duplexer module 10 of the first preferred embodiment.

Figure 7:
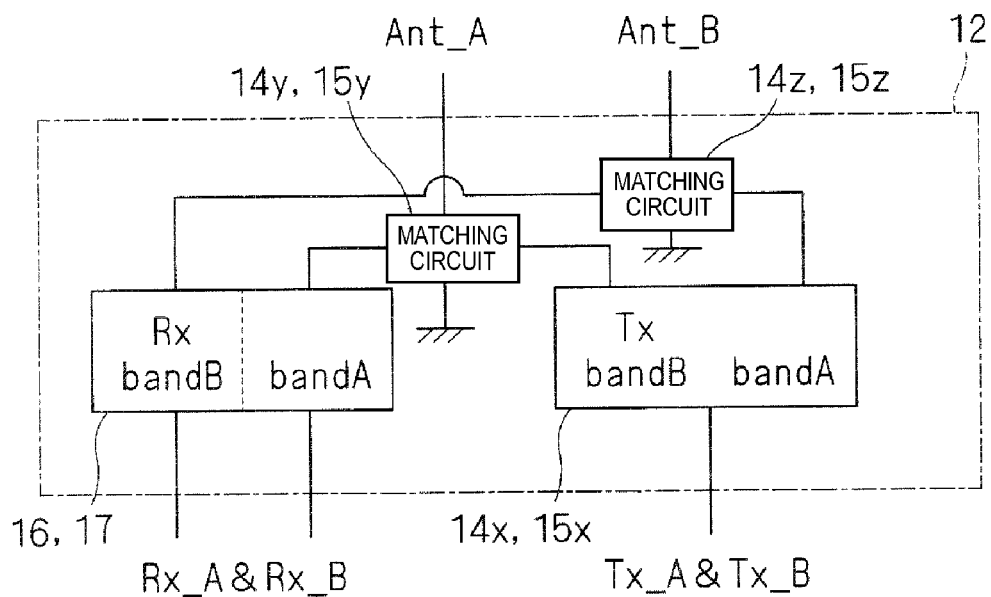
FIG. 7 is a block diagram of a duplexer module for two bands according to a second preferred embodiment of the present invention.

In the duplexer module 10x, the transmission filter and the reception filter supporting the band 1 and the band 2 and the transmission filter and the reception filter supporting the band 5 and the band 8 are configured as shown in the block diagram in FIG. 7. Referring to FIG. 7, the band 1 or the band 5 corresponds to the band A and the band 2 or the band 8 corresponds to the band B.

As illustrated in FIG. 7, the reception filter unit for the band A and the band B (the dual reception filter 16 for the band 1 and the band 2 and the dual reception filter 17 for the band 5 and the band 8), a transmission filter unit for the band A and the band B (a dual transmission filter 14x for the band 1 and the band 2 and a dual transmission filter 15x for the band 5 and the band 8), and matching circuits for the band A and the band B (a matching circuit 14y for the band 1, a matching circuit 14z for the band 2, a matching circuit 15y for the band 5, and a matching circuit 15z for the band 8) are provided on the wiring board 12 represented by an alternate long and short dash line, as in the first preferred embodiment.

Figure 8:
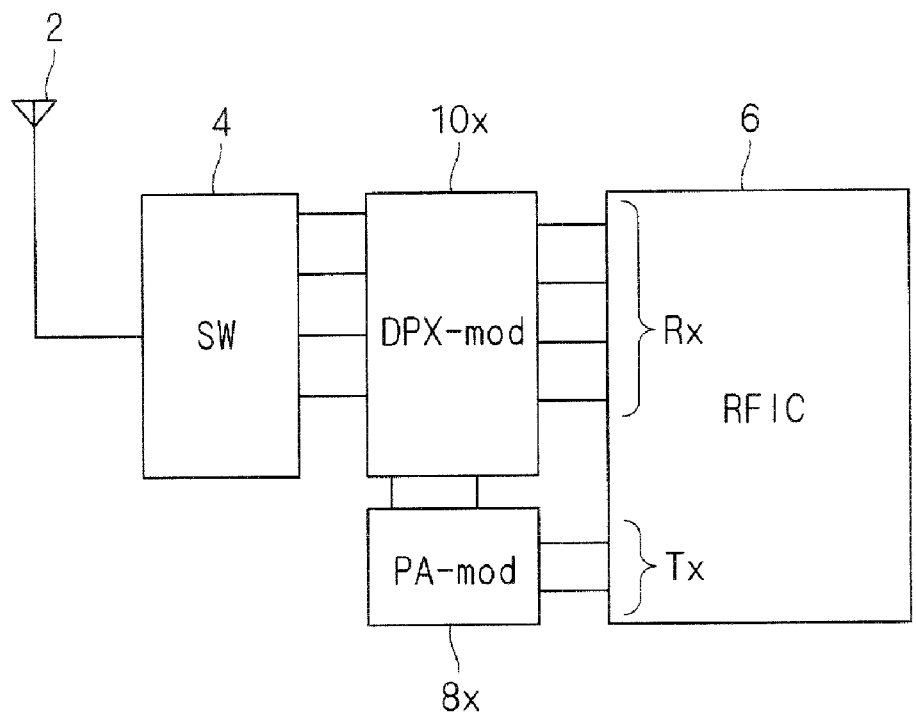
FIG. 8 is a block diagram illustrating how the duplexer module is used according to the second preferred embodiment of the present invention.

FIG. 8 is a block diagram illustrating how the duplexer module 10x of the second preferred embodiment is used. As illustrated in the block diagram in FIG. 8, preferably, four antenna terminals supporting the bands 1, 2, 5, and 8 of the duplexer module 10x are connected to the antenna 2 via the switching circuit 4 and four reception terminals of the duplexer module 10x are connected to the Rx terminal of the RFIC 6, as in the first preferred embodiment. The four reception terminals of the duplexer module 10x preferably include a pair of balanced output terminals commonly used for the reception filters for the band 1 and the band 2 and a pair of balanced output terminals commonly used for the reception filters for the band 5 and the band 8. Two transmission terminals of the duplexer module 10x are connected to the Tx terminal of the RFIC 6 via a power amplifier module 8x. Preferably, the two transmission terminals of the duplexer module 10x are an unbalanced input terminal commonly used for the transmission filters for the band 1 and the band 2 and an unbalanced input terminal commonly used for the transmission filters for the band 5 and the band 8.

As in the first preferred embodiment, each of the dual reception filters 16 and 17 in the reception filter unit preferably includes a reception filter for the band A and a reception filter for the band B, which are different in frequency, and include two unbalanced inputs-one balanced output. Specifically, a balanced output terminal is preferably commonly used for the reception filter for the band A and the reception filter for the band B in the dual reception filters 16 and 17. The reception filters for the band A and the band B are preferably filters having the balanced-unbalanced conversion function. As illustrated in FIG. 7, each of the dual reception filters 16 and 17 preferably includes an unbalanced input terminal connected to the matching circuits 14y and 15y for the band A, an unbalanced input terminal connected to the matching circuits 14z and 15z for the band B, and a pair of balanced output terminals commonly used for the band A and the band B.

Each of the dual transmission filters 14x and 15x in the transmission filter unit preferably includes a transmission filter for the band A and a transmission filter for the band B, which are different in frequency, and includes one unbalanced input-two unbalanced outputs. An unbalanced input terminal is preferably commonly used for the transmission filter for the band A and the transmission filter for the band B in the dual transmission filters 14x and 15x, unlike the dual transmission filters 14 and 15 of the first preferred embodiment. Specifically, as illustrated in FIG. 7, each of the dual transmission filters 14x and 15x preferably includes an unbalanced output terminal connected to the matching circuits 14y and 15y for the band A, an unbalanced output terminal connected to the matching circuits 14z and 15z for the band B, and an unbalanced input terminal commonly used for the band A and the band B.

Since the duplexer module 10x of the second preferred embodiment supports the bands 1, 2, 5, and 8, the dual reception filter 16 for the band 1 and the band 2, the dual transmission filter 14x for the band 1 and the band 2, the matching circuit 14y for the band 1, the matching circuit 14z for the band 2, the dual reception filter 17 for the band 5 and the band 8, the dual transmission filter 15x for the band 5 and the band 8, the matching circuit 15y for the band 5, and the matching circuit 15z for the band 8 are provided on the wiring board 12. The duplexer module 10x of the second preferred embodiment preferably includes the antenna terminal Ant_A for the band 1, the antenna terminal Ant_B for the band 2, a transmission terminal Tx_A&Tx_B commonly used for the band 1 and the band 2, the reception terminal Rx_A&Rx_B commonly used for the band 1 and the band 2, the antenna terminal Ant_A for the band 5, the antenna terminal Ant_B for the band 8, a transmission terminal Tx_A&Tx_B commonly used for the band 5 and the band 8, and the reception terminal Rx_A&Rx_B commonly used for the band 5 and the band 8.

The same input terminal can preferably be commonly used for the transmission filter for the band A and the transmission filter for the band B so as to reduce the number of terminals in the transmission filter unit including the multiple transmission filters, thus simplifying the wiring patterns on the wiring board. In addition, since the matching circuit can be commonly used when the matching circuit is connected at the side of the input terminal of the transmission filter unit, the number of chip components defining the matching circuit can be reduced by half. Furthermore, it is not necessary to provide the SPDT switch, which should be provided between the power amplifier in the power amplifier module 8x and the duplexer module 10x to switch the transmission filter.

Preferably, the balanced output terminal is commonly used for the reception filter for the band A and the reception filter for the band B in the dual reception filters 16 and 17 in the reception filter unit and the unbalanced input terminal is commonly used for the transmission filter for the band A and the transmission filter for the band B in the dual transmission filters 14x and 15x in the transmission filter unit in the second preferred embodiment. However, preferred embodiments of the present invention are not limited to such a configuration.

For example, the balanced output terminal may not be commonly used for the reception filter for the band A and the reception filter for the band B in the dual reception filters in the reception filter unit whereas the unbalanced input terminal may be commonly used for the transmission filter for the band A and the transmission filter for the band B in the dual transmission filters in the transmission filter unit.

With the above configuration, since the input terminal is commonly used for the transmission filters in the transmission filter unit including the multiple transmission filters, the wiring patterns on the wiring board can be simplified. Accordingly, this configuration is superior in terms of electrical characteristics, such as isolation characteristics and insertion loss, and in terms of cost as compared to a case in which the input terminal is not commonly used for the transmission filters. In addition, it is not necessary to use the switches in the connection to the power amplifier.

Comparative Example

A duplexer module of a comparative example will now be described with reference to FIG. 9 to FIG. 15B.

The duplexer module of the comparative example supports the four bands (the bands 1, 2, 5, and 8) in the UMTS, as in the first and second preferred embodiments. The duplexer module of the comparative example includes four duplexers corresponding to the respective bands 1, 2, 5, and 8 provided therein. The duplexer supporting the band 1, the duplexer supporting the band 2, the duplexer supporting the band 5, and the duplexer supporting the band 8 are configured as illustrated in the block diagram in FIG. 9.

Figure 9:
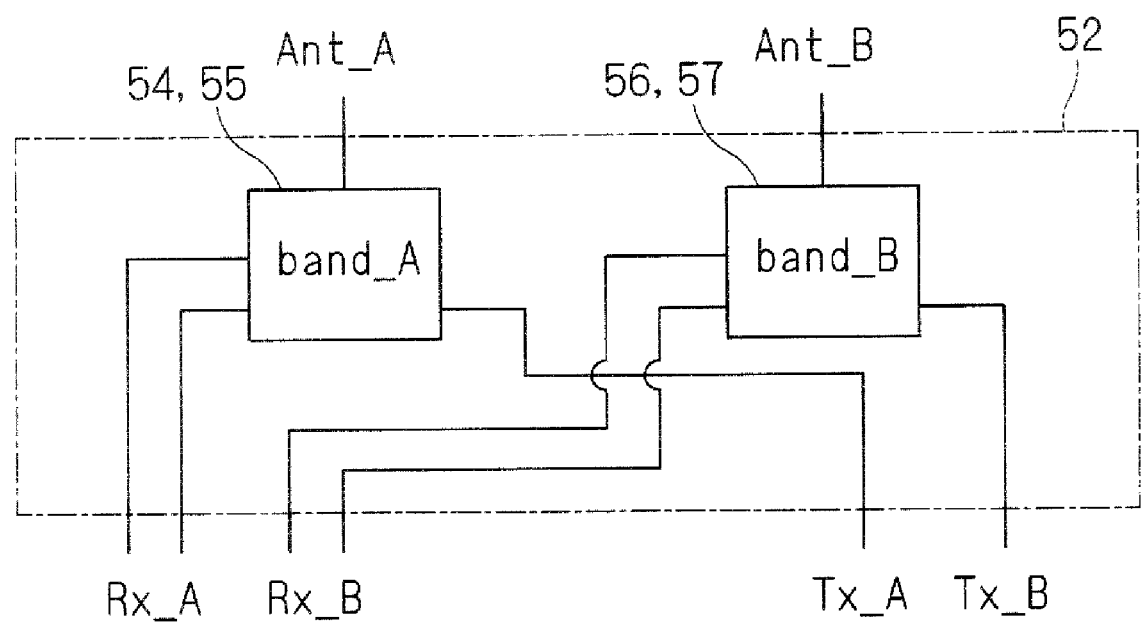
FIG. 9 is a block diagram of a duplexer module for two bands according to a comparative example.

Specifically, the band A corresponds to the band 1 or the band 5 and the band B corresponds to the band 2 or the band 8. Duplexers (a duplexer 54 for the band 1 and a duplexer 55 for the band 5) each including the transmission filter and the reception filter for the band A and duplexers (a duplexer 56 for the band 2 and a duplexer 57 for the band 8) each including the transmission filter and the reception filter for the band B are provided on a wiring board 52 represented by an alternate long and short dash line. As illustrated in FIG. 9, each of the duplexers includes the transmission filter of unbalanced input and output and the reception filter of unbalanced input-balanced output, having the balanced-unbalanced conversion function.

Since the duplexer module of the comparative example supports the bands 1, 2, 5, and 8, the duplexer 54 for the band 1, the duplexer 56 for the band 2, the duplexer 55 for the band 5, and the duplexer 57 for the band 8 are provided on the wiring board 52. The duplexer module of the comparative example includes an antenna terminal Ant_A for the band 1, an antenna terminal Ant_B for the band 2, a transmission terminal Tx_A for the band 1, a transmission terminal Tx_B for the band 2, a reception terminal Rx_A for the band 1, a reception terminal Rx_B for the band 2, an antenna terminal Ant_A for the band 5, an antenna terminal Ant_B for the band 8, a transmission terminal Tx_A for the band 5, a transmission terminal Tx_B for the band 8, a reception terminal Rx_A for the band 5, and a reception terminal Rx_B for the band 8.

Four antenna terminals supporting the bands 1, 2, 5, and 8 of the duplexer module of the comparative example are connected to an antenna 2 via a switching circuit 4. Eight reception terminals of the duplexer module of the comparative example are connected to an Rx terminal of a RFIC 6. The eight reception terminals of the duplexer module of the comparative example include a pair of balanced output terminals corresponding to the reception filter for the band 1, a pair of balanced output terminals corresponding to the reception filter for the band 2, a pair of balanced output terminals corresponding to the reception filter for the band 5, and a pair of balanced output terminals corresponding to the reception filter for the band 8. Four transmission terminals supporting the bands 1, 2, 5, and 8 of the duplexer module of the comparative example are connected to a Tx terminal of the RFIC 6 via a power amplifier module 8. The four transmission terminals of the duplexer module of the comparative example are unbalanced input terminals corresponding to the respective transmission filters for the bands 1, 2, 5, and 8.

Figure 10:
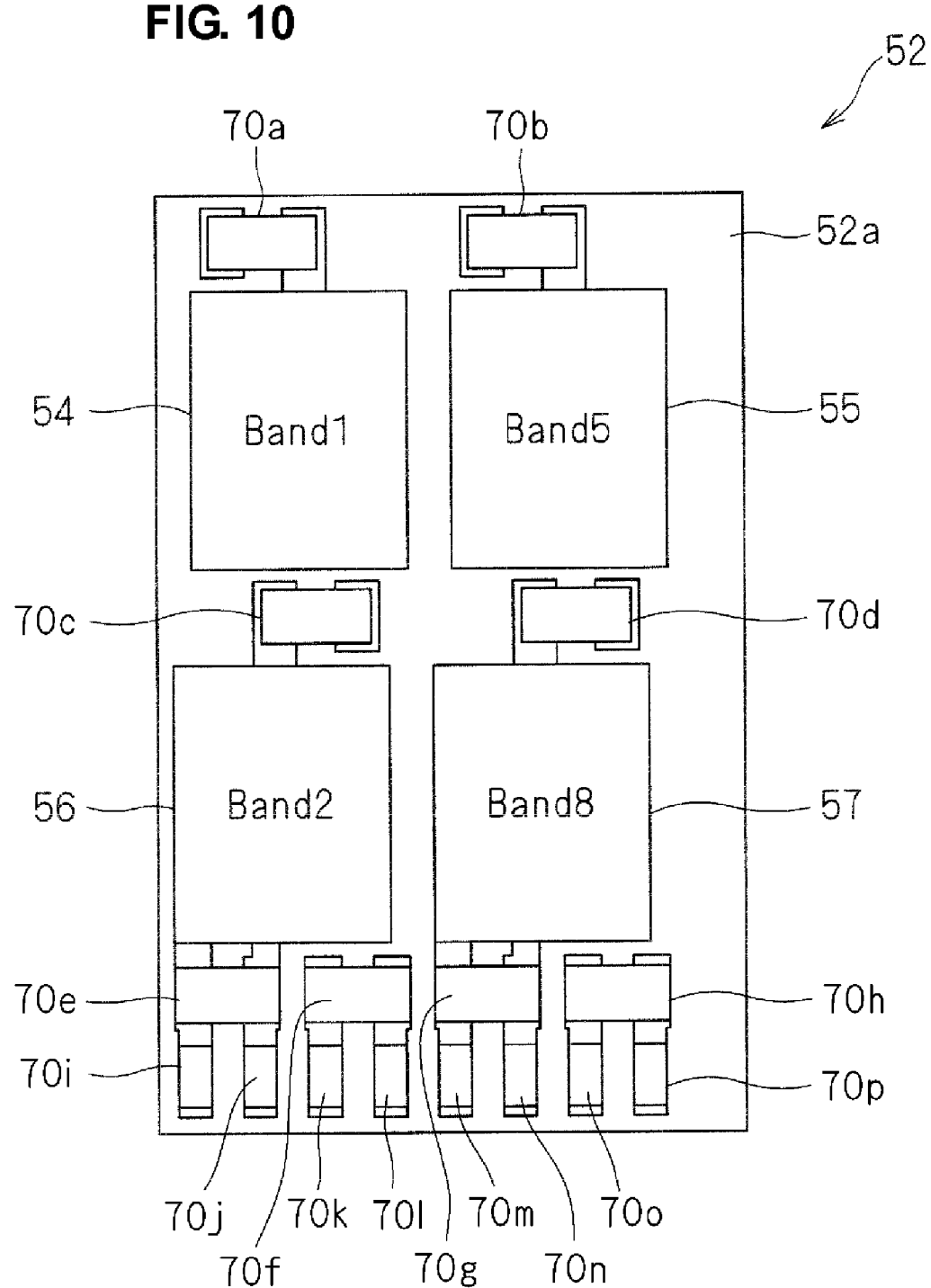
FIG. 10 is a plan view illustrating a state in which components are mounted on a front surface of a wiring board of the duplexer module according to the comparative example.
Figure 11:
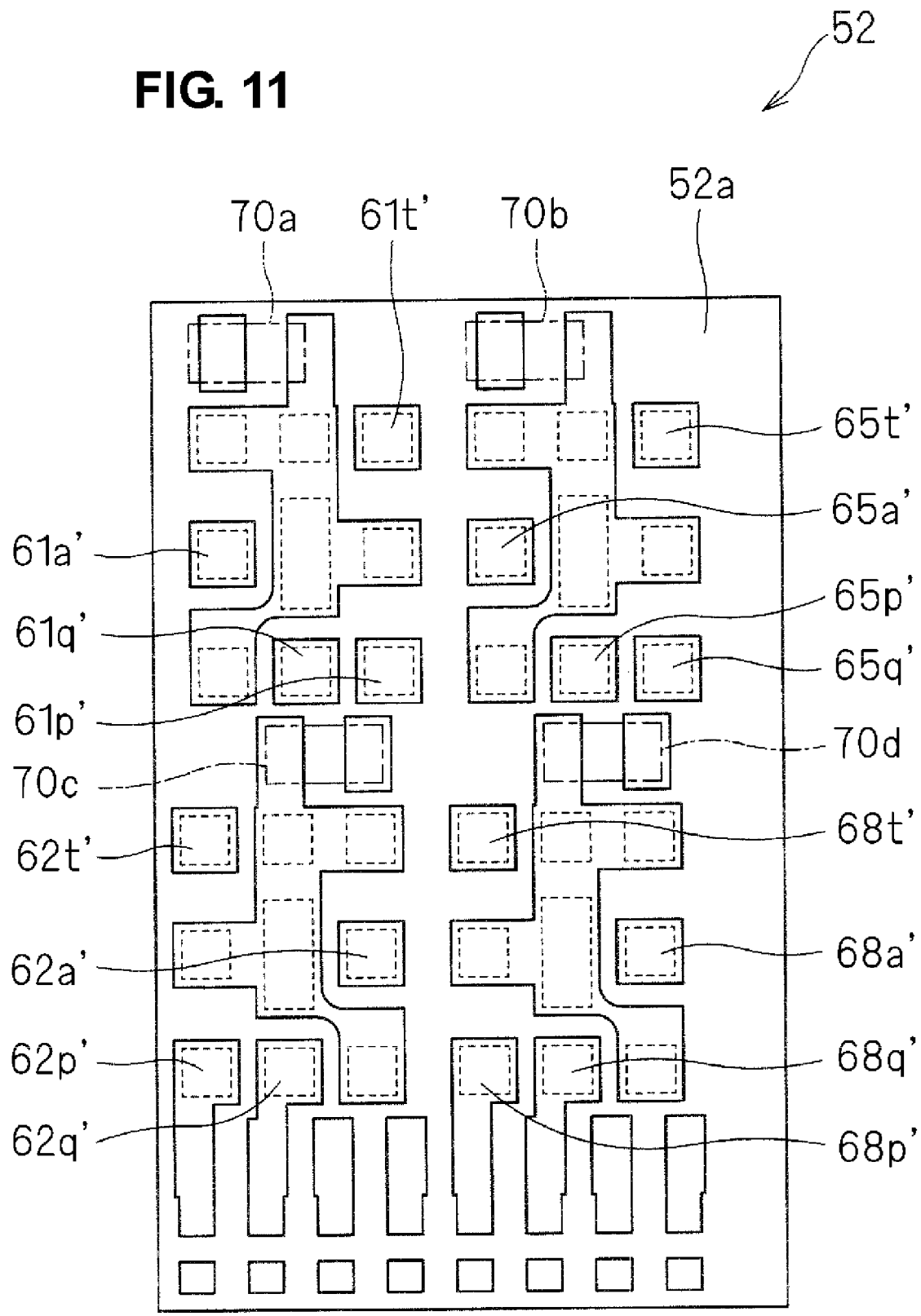
FIG. 11 is a plan view illustrating a conductive pattern on the front surface of the wiring board according to the comparative example.

FIG. 10 is a plan view illustrating a state in which components are mounted on a front surface 52a of the wiring board 52 of the duplexer module of the comparative example. FIG. 11 is a plan view of the front surface 52a of the wiring board 52. FIG. 12 is a perspective view of a rear surface 52b of the wiring board 52.

As illustrated in FIG. 10, the duplexer 54 for the band 1, the duplexer 55 for the band 5, the duplexer 56 for the band 2, the duplexer 57 for the band 8, and chip components (multilayer chip capacitors or inductors) 70a, 70b, 70c, 70d, 70e, 70f, 70g, 70h, 70i, 70j, 70k, 70l, 70m, 70n, 70o, and 70p defining matching circuits are mounted on the front surface 52a of the wiring board 52.

As illustrated in FIG. 11, a conductive pattern is provided on the front surface 52a of the wiring board 52. Broken lines in FIG. 11 indicate the terminal portions of the duplexers 54 to 57 mounted on the front surface 52a of the wiring board 52. As illustrated in FIG. 11, multiple pads including pads 61t', 62t', 65t', and 68t'; 61a', 62a', 65a', and 68a'; 61p', 62p', 65p', and 68p'; and 61q', 62q', 65q', and 68q' connected to the duplexers 54 to 57 are provided on portions on which the broken lines are superposed on the conductive pattern provided on the front surface 52a of the wiring board 52. In addition, pads connected to the chip components 70a to 70d and pads connected to the chip components 70e to 70p are provided on portions on which alternate long and short dash lines are superposed on the conductive pattern provided on the front surface 52a of the wiring board 52. Furthermore, wiring patterns connected to theses pads are provided.

The duplexer 54 includes an unbalanced input terminal and an unbalanced output terminal corresponding to the transmission filter for the band 1 and an unbalanced input terminal and balanced output terminals corresponding to the reception filter for the band 1. The unbalanced input terminal corresponding to the transmission filter for the band 1 in the duplexer 54 is connected to the pad 61t'. One of the balanced output terminals corresponding to the reception filter for the band 1 in the duplexer 54 is connected to the pad 61p' and the other thereof is connected to the pad 61q'. The unbalanced output terminal corresponding to the transmission filter for the band 1 in the duplexer 54 and the unbalanced input terminal corresponding to the reception filter for the band 1 in the duplexer 54 are connected to the pad 61a'.

The duplexer 55 includes an unbalanced input terminal and an unbalanced output terminal corresponding to the transmission filter for the band 5 and an unbalanced input terminal and balanced output terminals corresponding to the reception filter for the band 5. The unbalanced input terminal corresponding to the transmission filter for the band 5 in the duplexer 55 is connected to the pad 65t'. One of the balanced output terminals corresponding to the reception filter for the band 5 in the duplexer 55 is connected to the pad 65p' and the other thereof is connected to the pad 65q'. The unbalanced output terminal corresponding to the transmission filter for the band 5 in the duplexer 55 and the unbalanced input terminal corresponding to the reception filter for the band 5 in the duplexer 55 are connected to the pad 65a'.

The duplexer 56 includes an unbalanced input terminal and an unbalanced output terminal corresponding to the transmission filter for the band 2 and an unbalanced input terminal and balanced output terminals corresponding to the reception filter for the band 2. The unbalanced input terminal corresponding to the transmission filter for the band 2 in the duplexer 56 is connected to the pad 62t'. One of the balanced output terminals corresponding to the reception filter for the band 2 in the duplexer 56 is connected to the pad 62p' and the other thereof is connected to the pad 62q'. The unbalanced output terminal corresponding to the transmission filter for the band 2 in the duplexer 56 and the unbalanced input terminal corresponding to the reception filter for the band 2 in the duplexer 56 are connected to the pad 62a'.

The duplexer 57 includes an unbalanced input terminal and an unbalanced output terminal corresponding to the transmission filter for the band 8 and an unbalanced input terminal and balanced output terminals corresponding to the reception filter for the band 8. The unbalanced input terminal corresponding to the transmission filter for the band 8 in the duplexer 57 is connected to the pad 68t'. One of the balanced output terminals corresponding to the reception filter for the band 8 in the duplexer 57 is connected to the pad 68p' and the other thereof is connected to the pad 68q'. The unbalanced output terminal corresponding to the transmission filter for the band 8 in the duplexer 57 and the unbalanced input terminal corresponding to the reception filter for the band 8 in the duplexer 57 are connected to the pad 68a'.

As illustrated in FIG. 12, the wiring board 52 has a substantially rectangular front surface 52a and a substantially rectangular rear surface 52b, which are parallel or substantially parallel to each other and which define a first main surface and a second main surface, and four side surfaces: first to fourth side surfaces 52p, 52q, 52r, and 52s. A conductive pattern is provided on the rear surface 52b of the wiring board 52. Specifically, a transmission terminal 62t for the band 2, a transmission terminal 61t for the band 1, a transmission terminal 68t for the band 8, and a transmission terminal 65t for the band 5 are arranged along the first side surface 52p of the wiring board 52. An antenna terminal 61a for the band 1, an antenna terminal 65a for the band 5, an antenna terminal 68a for the band 8, and an antenna terminal 62a for the band 2 are arranged along the second side surface 52q of the wiring board 52. Reception terminals 62p and 62q for the band 2, reception terminals 61p and 61q for the band 1, reception terminals 68p and 68q for the band 8, and reception terminals 65p and 65q for the band 5 are arranged along the third side surface 52r of the wiring board 52. In addition, a shield pattern 64 is provided on the rear surface 52b of the wiring board 52.

The transmission terminal 61t for the band 1 corresponds to the Tx_A for the band 1 in FIG. 9. The transmission terminal 62t for the band 2 corresponds to the transmission terminal Tx_B for the band 2 in FIG. 9. The transmission terminal 65t for the band 5 corresponds to the transmission terminal Tx_A for the band 5 in FIG. 9. The transmission terminal 68t for the band 8 corresponds to the transmission terminal Tx_B for the band 8 in FIG. 9.

The antenna terminal 61a for the band 1 corresponds to the antenna terminal Ant_A for the band 1 in FIG. 9. The antenna terminal 62a for the band 2 corresponds to the antenna terminal Ant_B for the band 2 in FIG. 9. The antenna terminal 65a for the band 5 corresponds to the antenna terminal Ant_A for the band 5 in FIG. 9. The antenna terminal 68a for the band 8 corresponds to the antenna terminal Ant_B for the band 8 in FIG. 9.

The reception terminals 61p and 61q, which are the balanced output terminals for the band 1, correspond to the reception terminals Rx_A and Rx_B for the band 1 in FIG. 9. The reception terminals 62p and 62q, which are the balanced output terminals for the band 2, correspond to the reception terminals Rx_A and Rx_B for the band 2 in FIG. 9. The reception terminals 65p and 65q, which are the balanced output terminals for the band 5, correspond to the reception terminals Rx_A and Rx_B for the band 5 in FIG. 9. The reception terminals 68p and 68q, which are the balanced output terminals for the band 8, correspond to the reception terminals Rx_A and Rx_B for the band 8 in FIG. 9.

Referring to FIG. 11, among the pads arranged at the side of the front surface 52a of the wiring board 52, the pads electrically connected to the terminals at the side of the rear surface 52b of the wiring board 52 illustrated in FIG. 12 are denoted by reference numerals including the addition of a slash (') to the reference numerals of the terminals to which the pads are electrically connected.

Figure 13B:
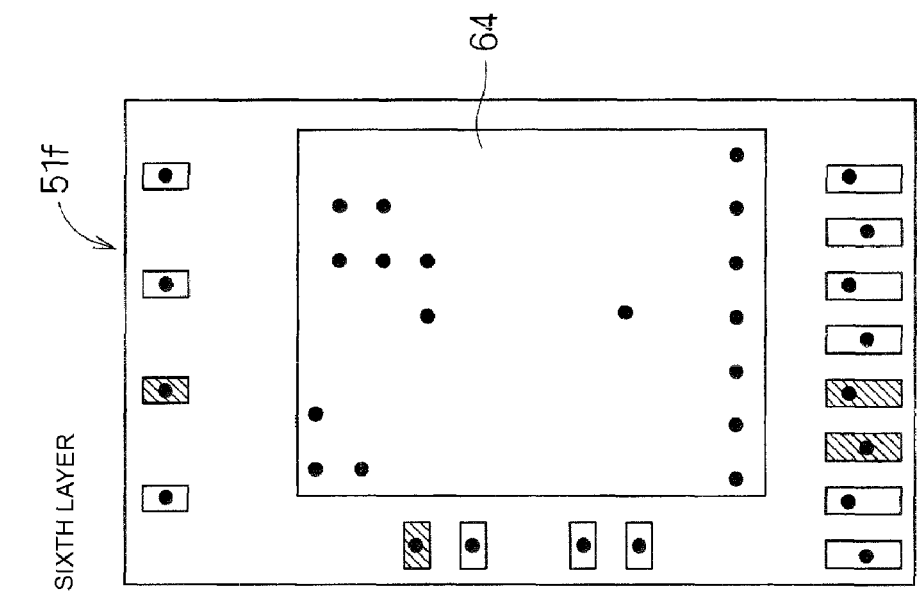
FIG. 13A is a plan view of a first-layer conductive pattern of the wiring board and FIG. 13B is a perspective view of a sixth-layer conductive pattern of the wiring board according to the comparative example.
Figure 13A:
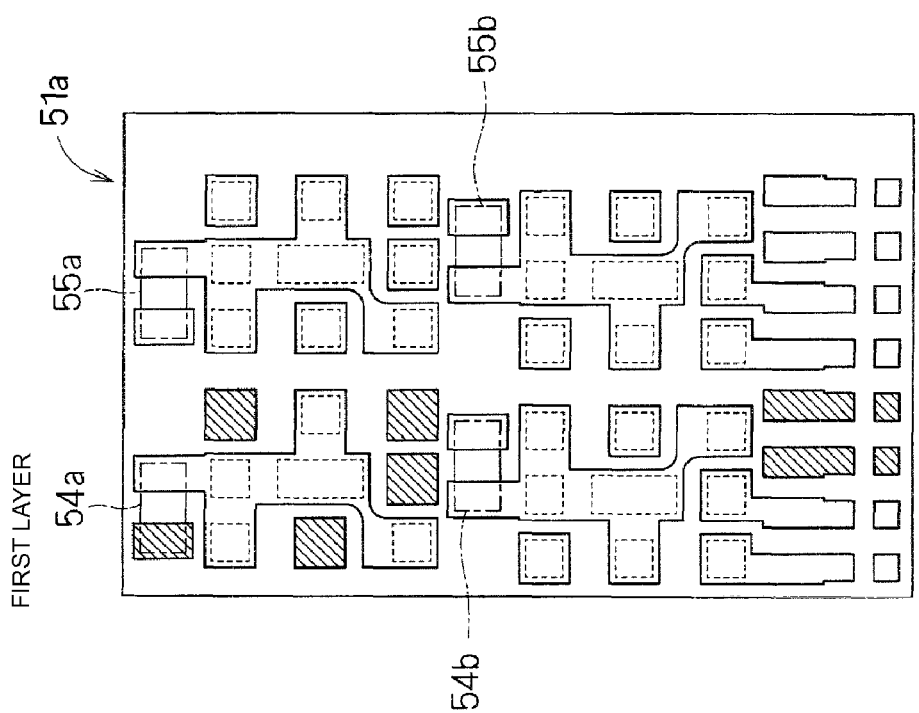

The wiring board 52 is manufactured preferably by laminating six conductive patterns 51a to 51f on five dielectric layers made of resin or ceramics, as illustrated in FIG. 13A to FIG. 15B. FIG. 13A is a plan view of the first-layer conductive pattern 51a and corresponds to FIG. 11. FIG. 13B is a perspective view of the sixth-layer conductive pattern 51f and corresponds to FIG. 12. FIG. 14A is a perspective view of the second-layer conductive pattern 51b. FIG. 14B is a perspective view of the third-layer conductive pattern 51c. FIG. 15A is a perspective view of the fourth-layer conductive pattern 51d. FIG. 15B is a perspective view of the fifth-layer conductive pattern 51e. Black circles (●) in FIG. 13A to FIG. 15B indicate feed-through conductors electrically connecting the conductive patterns in the wiring board 52. The black circles (●) in FIG. 13B indicate the positions of the feed-through conductors that electrically connect the conductive pattern 51f and the conductive pattern 51e. The black circles (●) in FIG. 14A indicate the positions of the feed-through conductors that electrically connect the conductive pattern 51b to the conductive pattern 51a. The black circles (●) in FIG. 14B indicate the positions of the feed-through conductors that electrically connect the conductive pattern 51c to the conductive pattern 51b. The black circles (●) in FIG. 15A indicate the positions of the feed-through conductors that electrically connect the conductive pattern 51d to the conductive pattern 51c. The black circles (●) in FIG. 15B indicate the positions of the feed-through conductors that electrically connect the conductive pattern 51e to the conductive pattern 51d. The feed-through conductors are not illustrated in FIG. 11 and FIG. 12.

The conductive patterns connecting the pads and the terminals corresponding to the band 1 are shaded in FIG. 13A to FIG. 15B.

Figure 14B:
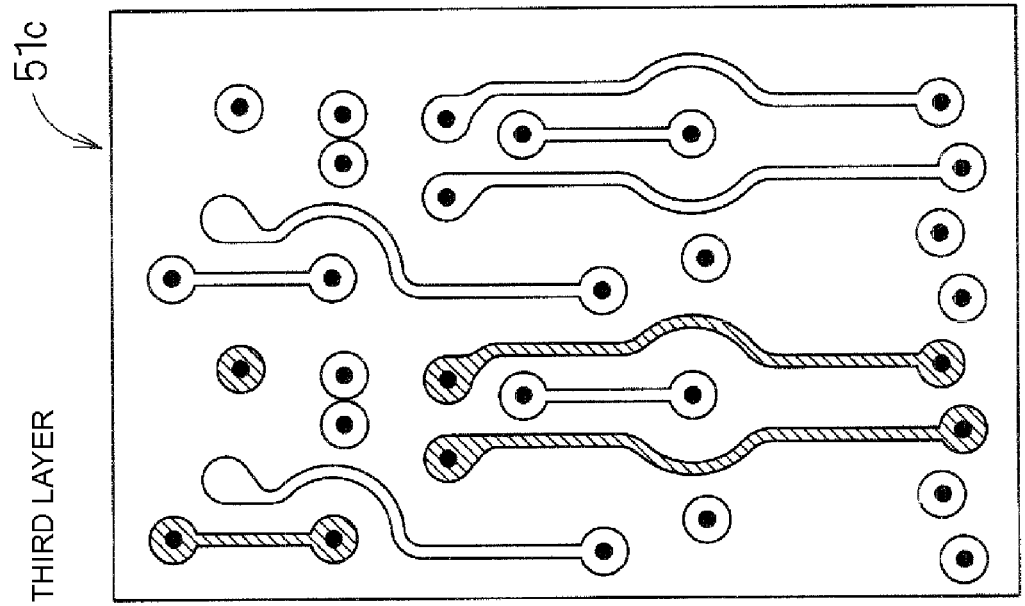
FIG. 14A is a perspective view of a second-layer conductive pattern of the wiring board and FIG. 14B is a perspective view of a third-layer conductive pattern of the wiring board according to the comparative example.
Figure 14A:
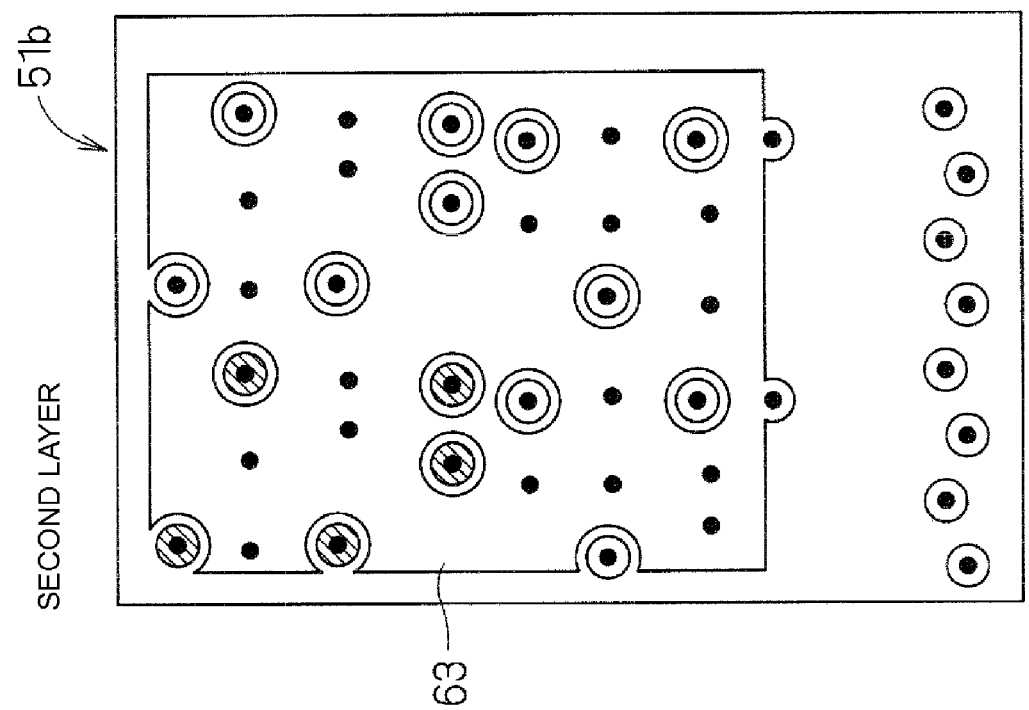
Figure 16:
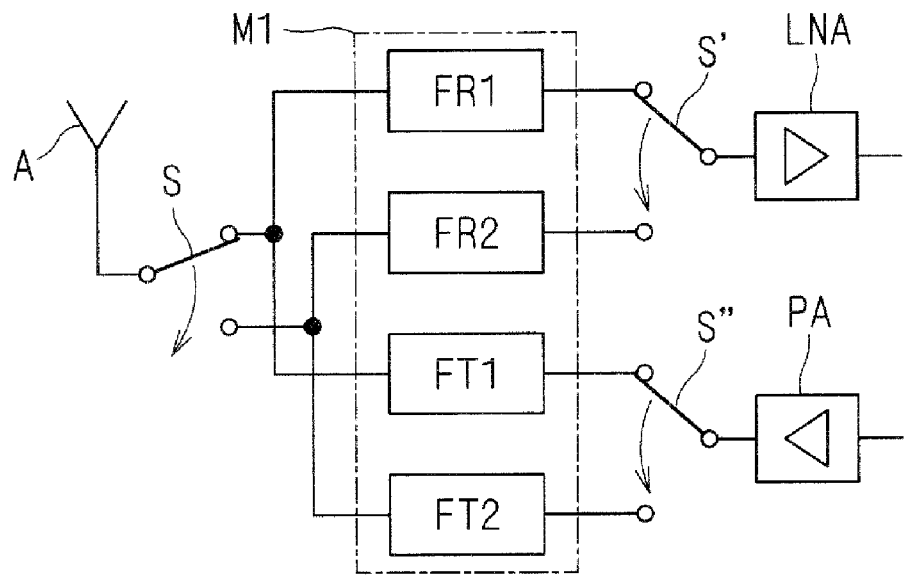
FIG. 16 schematically illustrates the structure of a duplexer module of the related art.
Figure 17:
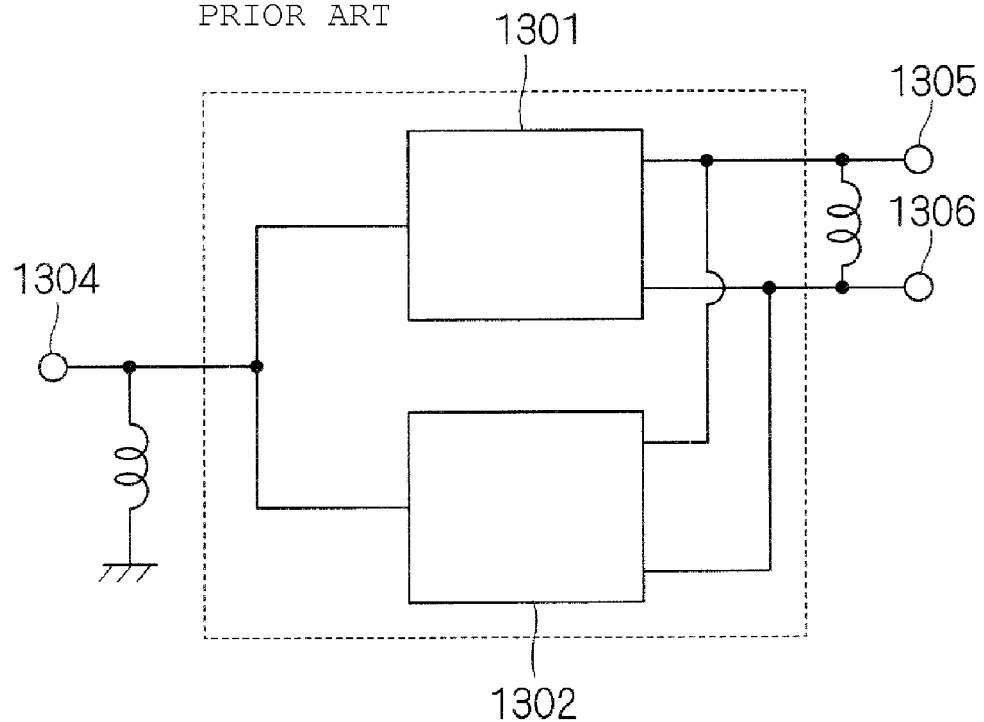
FIG. 17 schematically illustrates the structure of an elastic wave apparatus of the related art.

The conductive patterns formed in the wiring board 52 of the duplexer module of the comparative example include the wiring patterns, as illustrated in FIG. 14B and FIG. 15B, in addition to shield patterns 63, 63a, and 63b. Routing the wiring patterns in the wiring board 52, as in the duplexer of the comparative example, causes the wiring patterns to be lengthened which causes resistance loss. In addition, the wiring patterns are complicated and the routed wiring patterns are linked to each other which causes capacitive coupling between the ports. Accordingly, the insertion loss and the isolation are significantly degraded. In addition, since the structure of the wiring board 52 is complicated, it is difficult to decrease the number of dielectric layers in order to reduce the profile and to reduce the cost.

In the duplexer modules 10 and 10x of the first and second preferred embodiments of the present invention described above, the transmission terminals are preferably adjacently arranged and the reception terminals are preferably adjacently arranged. In addition, the multiple output terminals are preferably commonly used in the reception filter unit including the multiple reception filters to simplify the wiring patterns on the wiring board, thus preventing the electrical characteristics from being degraded.

The present invention is not limited to the above preferred embodiments and various modifications can be made.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A duplexer module used for transmission and reception of a signal in at least two communication systems using different frequency bands, the duplexer module comprising:
   a wiring board;
   a transmission filter unit provided on the wiring board and including at least two transmission filters; and
   a reception filter unit provided on the wiring board and including at least two reception filters; wherein
   the at least two reception filters have different frequency bands, and are arranged such that an output side of the at least two reception filters is shared between the at least two reception filters so that the at least two reception filters include a common output terminal;
   the wiring board includes a substantially rectangular first main surface and a substantially rectangular second main surface that are arranged substantially parallel to each other, a first side surface, a second side surface adjacent to the first side surface, a third side surface opposing the first side surface, and a fourth side surface adjacent to the first side surface;
   a first conductive pattern including a plurality of pads on which the reception filter unit and the transmission filter unit are mounted is provided on the first main surface of the wiring board; and
   a second conductive pattern including a plurality of transmission terminals arranged along the first side surface, a plurality of antenna terminals arranged along the second side surface, and a plurality of reception terminals arranged along the third side surface is provided on the second main surface of the wiring board.

2. The duplexer module according to claim 1, wherein the at least two transmission filters have different frequency bands, and arranged such that an input side of the at least two transmission filters is shared between the at least two transmission filters so that the at least two transmission filters include a common input terminal.

3. The duplexer module according to claim 1, wherein the reception filter unit is arranged near the third side surface of the wiring board on the first main surface of the wiring board.

4. The duplexer module according to claim 1, wherein the transmission filter unit is arranged near the first side surface of the wiring board on the first main surface of the wiring board.

5. The duplexer module according to claim 1, wherein the common output terminal of the at least two reception filters of the reception filter unit is connected to the pads arranged along the third side surface on the first main surface of the wiring board.

6. The duplexer module according to claim 1, wherein the transmission filter unit includes an input terminal, and the input terminal of the transmission filter unit is connected to the pads arranged along the first side surface on the first main surface of the wiring board.

7. A duplexer module used for transmission and reception of a signal in at least two communication systems using different frequency bands, the duplexer module comprising:
   a wiring board;
   a transmission filter unit provided on the wiring board and including at least two transmission filters; and
   a reception filter unit provided on the wiring board and including at least two reception filters; wherein
   the at least two transmission filters have different frequency bands, and are arranged such that an input side of the at least two transmission filters is shared between the at least two transmission filters so that the at least two transmission filters include a common input terminal;
   the wiring board includes a substantially rectangular first main surface and a substantially rectangular second main surface that are arranged substantially parallel to each other, a first side surface, a second side surface adjacent to the first side surface, a third side surface opposing the first side surface, and a fourth side surface adjacent to the first side surface;
   a first conductive pattern including a plurality of pads on which the reception filter unit and the transmission filter unit are mounted is provided on the first main surface of the wiring board; and
   a second conductive pattern including a plurality of transmission terminals arranged along the first side surface, a plurality of antenna terminals arranged along the second side surface, and a plurality of reception terminals arranged along the third side surface is provided on the second main surface of the wiring board.

8. The duplexer module according to claim 7, wherein the reception filter unit is arranged near the third side surface of the wiring board on the first main surface of the wiring board.

9. The duplexer module according to claim 7, wherein the transmission filter unit is arranged near the first side surface of the wiring board on the first main surface of the wiring board.

10. The duplexer module according to claim 7, wherein the reception filter unit includes an output terminal, and the output terminal of the reception filter unit is connected to the pads arranged along the third side surface on the first main surface of the wiring board.

11. The duplexer module according to claim 7, wherein the common input terminal of the at least two transmission filters of the transmission filter unit is connected to the pads arranged along the first side surface on the first main surface of the wiring board.

* * * * *